United States Patent
Gao et al.

(10) Patent No.: US 10,017,694 B2
(45) Date of Patent: Jul. 10, 2018

(54) LIQUID CRYSTAL MEDIUM CONTAINING 2,4-DIFLUROPHENYL COMPOUNDS AND USE

(71) Applicant: SHIJIAZHUANG CHENGZHI YONGHUA DISPLAY MATERIALS CO., LTD., Hebei (CN)

(72) Inventors: Hongru Gao, Hebei (CN); Yuqing Fu, Hebei (CN); Xuejiao Chen, Hebei (CN); Junhong Su, Hebei (CN); Renjie Liu, Hebei (CN)

(73) Assignee: Shijiazhuang Chengzhi Yonghua Display Materials Co., Ltd., Shijiazhuang (CN)

( * ) Notice: Subject to any disclaimer, the term of this patent is extended or adjusted under 35 U.S.C. 154(b) by 0 days.

(21) Appl. No.: 15/341,894

(22) Filed: Nov. 2, 2016

(65) Prior Publication Data

US 2017/0137712 A1  May 18, 2017

(30) Foreign Application Priority Data

Nov. 12, 2015 (CN) .......................... 2015 1 0770281

(51) Int. Cl.
| | | |
|---|---|---|
| *G02F 1/1333* | (2006.01) | |
| *C09K 19/30* | (2006.01) | |
| *C09K 19/34* | (2006.01) | |
| *C09K 19/04* | (2006.01) | |

(52) U.S. Cl.
CPC ...... *C09K 19/3098* (2013.01); *C09K 19/3003* (2013.01); *C09K 19/3066* (2013.01); *C09K 2019/0466* (2013.01); *C09K 2019/301* (2013.01); *C09K 2019/3004* (2013.01); *C09K 2019/3009* (2013.01); *C09K 2019/3016* (2013.01); *C09K 2019/3422* (2013.01)

(58) Field of Classification Search
CPC ............. G02F 1/1333; C09K 19/3098; C09K 19/3066; C09K 19/3003; C09K 2019/3422; C09K 2019/0466; C09K 2019/3004; C09K 2019/3009; C09K 2019/301; C09K 2019/3016
USPC .............. 252/299.01, 299.6, 299.63; 428/1.1
See application file for complete search history.

(56) References Cited

U.S. PATENT DOCUMENTS 4,548,731 A * 10/1985 Sugimori ................ C07C 17/35
                                                                    252/299.5
9,193,909 B2 * 11/2015 Wu .......................... C09K 19/32

* cited by examiner

*Primary Examiner* — Geraldina Visconti
(74) *Attorney, Agent, or Firm* — McCoy Russell LLP

(57) ABSTRACT

Disclosed is a liquid crystal medium containing a 2,4-diflurophenyl compound and the use thereof. The liquid crystal composition comprises the compounds as represented by formula I and formula II. The liquid crystal composition has a low rotary viscosity, good chemical and thermal stability and a fast response speed, it is suitable for a liquid crystal display device and particularly suitable for the use in an active matrix display of a TN, IPS or FFS mode.

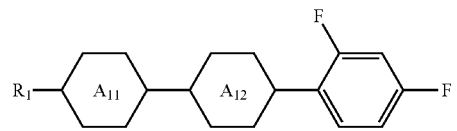

Formula I

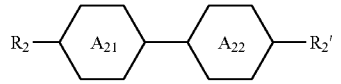

Formula II

10 Claims, No Drawings

LIQUID CRYSTAL MEDIUM CONTAINING 2,4-DIFLUROPHENYL COMPOUNDS AND USE

CROSS REFERENCE TO RELATED APPLICATIONS

The present application claims priority to Chinese Patent Application No. 201510770281.3, entitled "Liquid Crystal Medium Containing 2,4-Difluorophenyl Compounds and Use," filed on Nov. 12, 2015. The entire contents of which are hereby incorporated by reference for all purposes.

TECHNICAL FIELD

The present disclosure belongs to the field of liquid crystals, and relates to a liquid crystal medium containing 2,4-diflurophenyl compounds and use thereof.

BACKGROUND ART

Display is a process for converting an electric signal (data information) into a visible light (visual information), where an apparatus completing the display is a man-machine Interface (MMI) and flat panel displays (FPD) are a class of display apparatus which are the most popular currently. A liquid crystal display, (LCD) is a product which is the first developed and commercialized in FPDs. Currently, thin film transistor liquid crystals (TFT-LCD) have become a mainstream product in LCD application.

The development of TFT-LCD has experienced a lengthy stage of fundamental research, and after the realization of a mass production and commercialization, the TFT-LCD products have the advantages such as it being light and thin and environmentally friendly, high performance and the like, such that the size gets larger and larger, and the use becomes more and wider. Whether in a small-sized mobile phone screen, or a large-sized notebook computer (PC) or a monitor, and a large-scaled liquid crystal display television (LCDTV), the TFT-LCDs find application. The early commercial TFT-LCD products are essentially of a twisted nematic (TN) display mode, and the greatest problem is a visual angle not big enough. With the increase in size of the TFT-LCD products, particularly the use of the TFT-LCDs in the TV field, an in-plane switching (IPS) display mode featuring a wide view angle has been developed and applied. The IPS display mode is first published in the paper by the American R. Soref in 1974, and the German G Baur proposes to use the IPS as a wide view angle technique in the TFT-LCDs. In 1995, Japanese HITACHI CORPORATION developed the first 13.3-inch wide view angle TFT-LCD product of an IPS mode in the world. Korean Modern Corporation developed a TFT-LCD product of a fringe field switching (FFS) display mode on the basis of IPS.

The TFT-LCD is a liquid crystal display device with a TFT switch control, and the electrical and optical properties of the liquid crystal directly affect the display effect. Different kinds of liquid crystals have different electrical and optical properties, and different display modes. The performance parameters which have greater influences on the liquid crystal materials used in the TFT-LCDs are an operating temperature range, a driving voltage, a response speed, a contrast ratio, a hue, a tone, a view angle, etc., wherein the driving voltage is greatly influenced by the dielectric constant anisotropy and the elastic coefficient, the viscosity and the elastic coefficient affect the response speed of the liquid crystal materials, and the phase difference and the refractive index anisotropy affect the hue of the liquid crystal display. Those previous cyano-containing compounds cannot satisfy these conditions, and only the fluorine-containing liquid crystal materials can be suitable for making TFT-LCDs.

Furthermore, a liquid crystal molecule cannot achieve all the requirements of the TFT-LCD display, so various liquid crystal molecules must be combined. The various physical property requirements of the liquid crystal material can be achieved by combining various liquid crystal molecules, and these requirements mainly comprise 1) a high stability, 2) a moderate birefringence, 3) a low viscosity, 4) a greater dielectric anisotropy, and 5) a wide temperature range. An ideal storage temperature range is $-40°$ C.$-100°$ C., and in general, in a special use such as a vehicle display, the temperature can be expanded to $-40°$ C.$-110°$ C.

Nowadays, the LCD product technique has become very mature, and successfully solves the technical difficulties such as a view angle, a resolution, a color saturation, brightness, etc., and the display performance thereof has been close to or more than that of CRT displays. The large-sized and medium- and small-sized LCDs have gradually become the dominant products of flat panel displays in respective fields. In order to pursue a higher performance specification, accelerating the response time has become an object pursued by various device manufacturers. In particular, the response time of a liquid crystal is restricted by the rotary viscosity $\gamma 1$/elastic constant K of a liquid crystal, and therefore, in view of a liquid crystal material, it is required to try to find a method to reduce the rotary viscosity $\gamma 1$ of a liquid crystal medium, and at the same time, to increase the elastic constant K to reach the purpose of accelerating the response time. However, in an actual research, it is found that the rotary viscosity and the elastic constant are a pair of contradictory parameters, and a reduction of the rotary viscosity will results in an increase of the elastic constant, and as a result, the object for reducing the response time cannot be achieved. The object for accelerating the response time can be achieved by reducing a cell thickness d from a device aspect, which would be very easy to achieve; however, since the delay amount $\Delta$nd of a device is fixed, it is required to increase the optical anisotropy $\Delta$n in view of a liquid crystal material in order to reduce the cell thickness d thereof; therefore, in order to achieve the above-mentioned requirements, it is necessary to develop a series of compounds with superior performances to solve the problem that the response time of a liquid crystal display is slow.

SUMMARY OF THE DISCLOSURE

An object of the present disclosure is to provide a liquid crystal medium containing a 2,4-diflurophenyl compound and the use thereof.

The liquid crystal medium containing a 2,4-diflurophenyl compound provided in the present disclosure is a liquid crystal composition, and the liquid crystal composition comprises a component (1) and a component (2);
said component (1) is composed of at least one of the compounds as represented by formula I;
said component (2) is composed of at least one of the compounds as represented by formula II;

Formula I

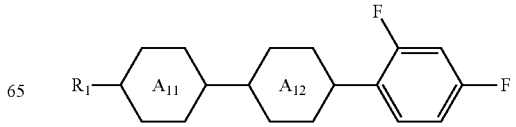

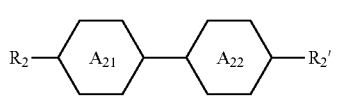
Formula II in said formulae I and II,

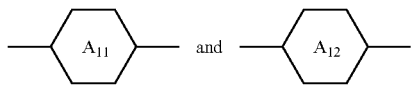

are both selected from any one of the following groups:

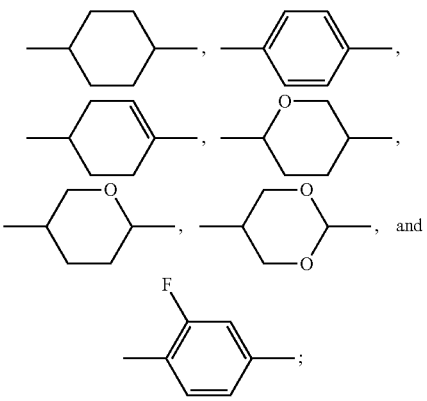

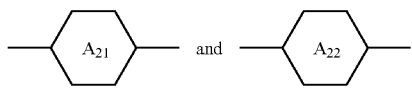

each independently represent

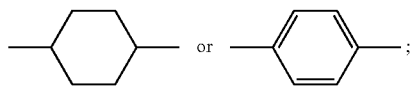

$R_1$ independently represents a linear alkyl having a carbon atom number of 1-7 or a group obtained by replacing at least one —$CH_2$— in said linear alkyl having a carbon atom number of 1-7 with —O— or —CH=CH—;

and $R_2$ and $R_2'$ represent a linear alkyl having a carbon atom number of 1-7, an alkoxy having a carbon atom number of 1-7 or a linear alkenyl having a carbon atom number of 2-5.

In particular, in the definitions of said $R_1$, $R_2$ and $R_2'$, said linear alkyl having a carbon atom number of 1-7 is particularly a C1, C2, C3, C4, C5, C6 or C7 linear alkyl, or a C1-C6 linear alkyl, or a C1-C5 linear alkyl, or a C1-C4 linear alkyl, or a C1-C3 linear alkyl, or a C1-C2 linear alkyl, or a C2-C5 linear alkyl, or a C2-C4 linear alkyl, or a C2-C3 linear alkyl, or a C3-C5 linear alkyl, or a C3-C4 linear alkyl or a C4-C5 linear alkyl;

said alkoxy having a carbon atom number of 1-7 is particularly a C1, C2, C3, C4, C5, C6 or C7 alkoxy, or a C1-C6 alkoxy, or a C1-C5 alkoxy, or a C1-C4 alkoxy, or a C1-C3 alkoxy, or a C1-C2 alkoxy, or a C2-C5 alkoxy, or a C2-C4 alkoxy, or a C2-C3 alkoxy, or a C3-C5 alkoxy, or a C3-C4 alkoxy or a C4-C5 alkoxy;

said linear alkenyl having a carbon atom number of 2-5 is particularly a C2, C3, C4 or C5 linear alkenyl, or a C2-C5 linear alkenyl, or a C2-C4 linear alkenyl, or a C2-C3 linear alkenyl, or a C3-C5 linear alkenyl, or a C3-C4 linear alkenyl or a C4-C5 linear alkenyl;

in the above-mentioned liquid crystal composition, said component (1) is 1-50 parts, preferably 1-40 parts, and more particularly 1, 2, 5, 6, 8, 10, 12, 15, 17.75, 20, 23, 25, or 35 parts, in part by mass;

and said component (2) is 10-70 parts, preferably 15-60 parts, and more particularly 18, 20, 25, 27, 32, 34, 36, 38, 40, 50, 56, or 57 parts, in part by mass.

In particular, said compound as represented by formula I is selected from any one of the compounds as represented by formulae I-1 to I-8:

I-1
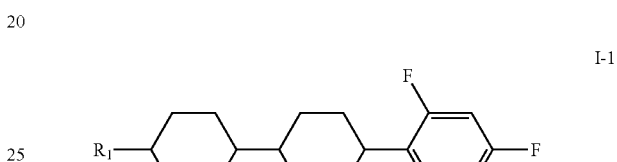

I-2
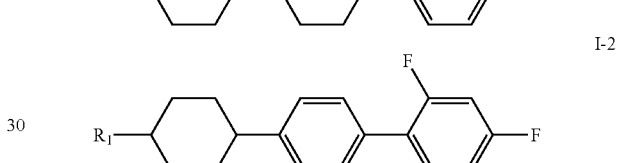

I-3
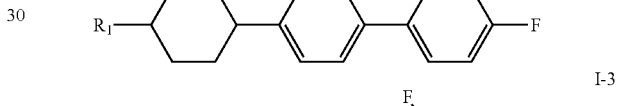

I-4
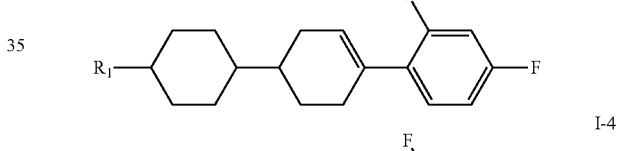

I-5
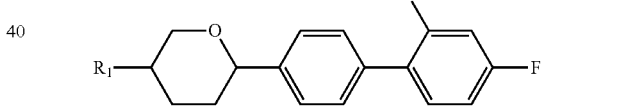

I-6
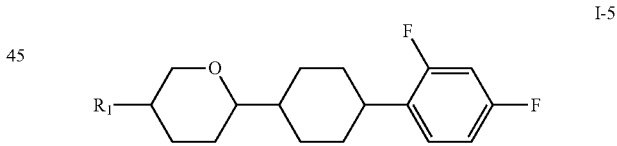

I-7
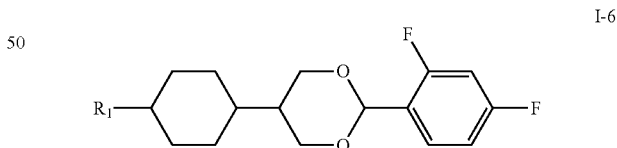

I-8
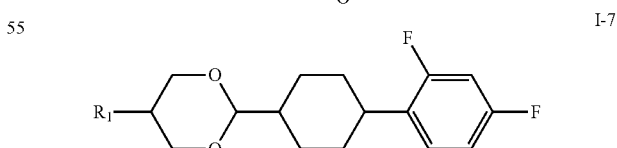

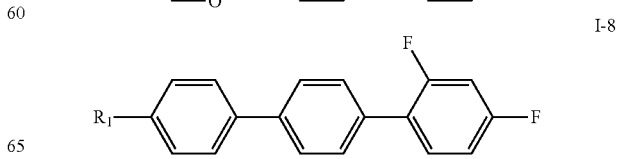

said compound as represented by formula II is selected from any one of the compounds as represented by formulae II-1 to II-9:

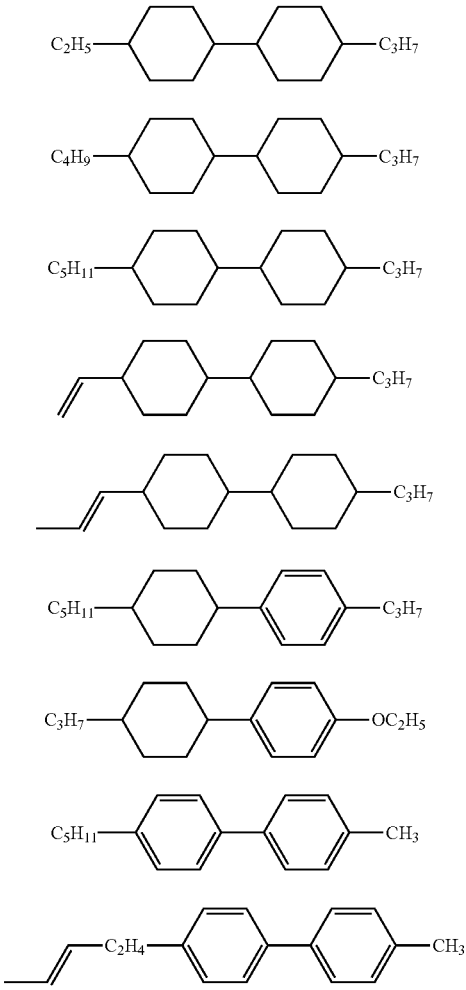

II-1
II-2
II-3
II-4
II-5
II-6
II-7
II-8
II-9 and in said formulae II-1 to II-9, the definition of $R_1$ is the same as that of the $R_1$ in said formula II.

Said liquid crystal composition further comprises a component (3) having a dielectric anisotropy of >0 or a component (4) having a dielectric anisotropy of <0;

said component (3) is selected from at least one of the compounds as represented by formula III;

said component (4) is selected from at least one of the compounds as represented by Formula IV:

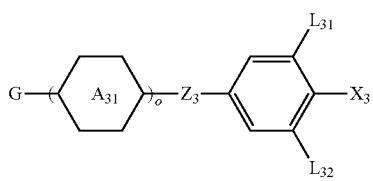

Formula III in said formula III,

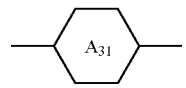

is

[ring structures shown]

and when o=2,

[ring structure with $A_{31}$]

is the same or different;

$X_3$ independently represents hydrogen, halogen, an alkyl having a carbon atom number of 1-10, an alkoxy having a carbon atom number of 1-10, an alkenyl having a carbon atom number of 2-10, an alkenyloxy having a carbon atom number of 2-10, a halogenated alkyl having a carbon atom number of 1-5, a halogenated alkoxy having a carbon atom number of 1-5, a halogenated alkenyl having a carbon atom number of 2-5 or a halogenated alkenyloxy having a carbon atom number of 2-5;

G independently represents the following group I, group II or group III:

I. selected from at least one of an alkyl having a carbon atom number of 1-7, an alkoxy having a carbon atom number of 1-7, an alkenyl having a carbon atom number of 2-7 and an alkenyloxy having a carbon atom number of 2-7;

II. groups obtained by replacing at least one hydrogen in said group I with fluorine;

III. selected from at least one of cyclopentyl, cyclobutyl and cyclopropyl;

$L_{31}$ and $L_{32}$ both independently represent —H or —F;

$Z_3$ independently represents —$CF_2O$—, —$CH_2$—, —$CH_2$—$CH_2$—, —$CH_2CF_2$—, —COO—, trans-CH=CH—, trans-CF=CF—, —$CH_2O$— or a single bond;

is 1 or 2;

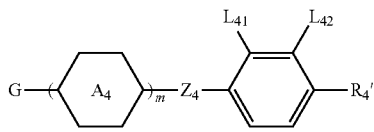

Formula IV in said formula IV, $R_4'$ independently represents a linear alkyl having a carbon atom number of 1-7 or an alkoxy having a carbon atom number of 1-7;

$L_{41}$ and $L_{42}$ both independently represent —H or —F;

the definition of G is the same as that of the G in said formula III;

$Z_4$ independently represents a single bond, —CH$_2$CH$_2$—, —COO— or —CH$_2$O—;

m is 1 or 2; and

represents

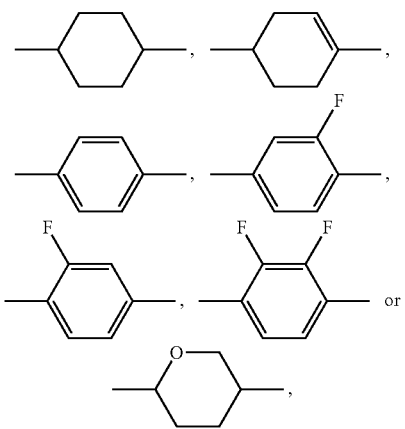

and when m=2,

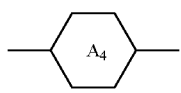

is the same or different.

In said formula III, in said halogenated alkyl having a carbon atom number of 1-5, said halogenated alkoxy having a carbon atom number of 1-5, said halogenated alkenyl having a carbon atom number of 2-5 or said halogenated alkenyloxy having a carbon atom number of 2-5, the halogenation is halogenation with a halogen atom, particularly fluorination, chlorination or bromination;

in particular, in the definition of said $X_3$, said alkyl having a carbon atom number of 1-10 is particularly a C1, C2, C3, C4, C5, C6, C7, C8, C9 or C10 alkyl, or a C1-C8 alkyl, or a C1-C6 alkyl, or a C1-C5 alkyl, or a C1-C4 alkyl, or a C1-C3 alkyl, or a C1-C2 alkyl, or a C2-C5 alkyl, or a C2-C4 alkyl, or a C2-C3 alkyl, or a C3-C5 alkyl, or a C3-C4 alkyl or a C4-C5 alkyl;

said alkoxy having a carbon atom number of 1-10 is particularly a C1, C2, C3, C4, C5, C6, C7, C8, C9 or C10 alkoxy, or a C1-C8 alkoxy, or a C1-C6 alkoxy, or a C1-C5 alkoxy, or a C1-C4 alkoxy, or a C1-C3 alkoxy, or a C1-C2 alkoxy, or a C2-C5 alkoxy, or a C2-C4 alkoxy, or a C2-C3 alkoxy, or a C3-C5 alkoxy, or a C3-C4 alkoxy or a C4-C5 alkoxy;

said alkenyl having a carbon atom number of 2-10 is particularly a C2, C3, C4, C5, C6, C7, C8, C9 or C10 alkenyl, or a C2-C5 alkenyl, a C2-C4 alkenyl, or a C2-C3 alkenyl, or a C3-C5 alkenyl, or a C3-C4 alkenyl or a C4-C5 alkenyl;

said alkenyloxy having a carbon atom number of 2-10 is particularly a C2, C3, C4, C5, C6, C7, C8, C9 or C10 alkenyloxy, or a C2-C5 alkenyloxy, a C2-C4 alkenyloxy, or a C2-C3 alkenyloxy, or a C3-C5 alkenyloxy, or a C3-C4 alkenyloxy or a C4-C5 alkenyloxy;

in particular, in the definition of said G, said alkyl having a carbon atom number of 1-7 is particularly a C1, C2, C3, C4, C5, C6 or C7 alkyl, or a C1-C6 alkyl, or a C1-C5 alkyl, or a C1-C4 alkyl, or a C1-C3 alkyl, or a C1-C2 alkyl, or a C2-C5 alkyl, or a C2-C4 alkyl, or a C2-C3 alkyl, or a C3-C5 alkyl, or a C3-C4 alkyl or a C4-C5 alkyl;

said alkoxy having a carbon atom number of 1-7 is particularly a C1, C2, C3, C4, C5, C6 or C7 alkoxy, or a C1-C6 alkoxy, or a C1-C5 alkoxy, or a C1-C4 alkoxy, or a C1-C3 alkoxy, or a C1-C2 alkoxy, or a C2-C5 alkoxy, or a C2-C4 alkoxy, or a C2-C3 alkoxy, or a C3-C5 alkoxy, or a C3-C4 alkoxy or a C4-C5 alkoxy;

said alkenyl having a carbon atom number of 2-7 is particularly a C2, C3, C4, C5, C6 or C7 alkenyl, or a C2-C5 alkenyl, or a C2-C4 alkenyl, or a C2-C3 alkenyl, or a C3-C5 alkenyl, or a C3-C4 alkenyl or a C4-C5 alkenyl;

said alkenyloxy having a carbon atom number of 2-7 is particularly a C2, C3, C4, C5, C6 or C7 alkenyloxy, or a C2-C5 alkenyloxy, or a C2-C4 alkenyloxy, or a C2-C3 alkenyloxy, or a C3-C5 alkenyloxy, or a C3-C4 alkenyloxy or a C4-C5 alkenyloxy;

in the definition of said G said alkoxy having a carbon atom number of 1-7 is particularly a C1, C2, C3, C4, C5, C6 or C7 alkoxy, or a C1-C6 alkoxy, or a C1-C5 alkoxy, or a C1-C4 alkoxy, or a C1-C3 alkoxy, or a C1-C2 alkoxy, or a C2-C5 alkoxy, or a C2-C4 alkoxy, or a C2-C3 alkoxy, or a C3-C5 alkoxy, or a C3-C4 alkoxy or a C4-C5 alkoxy;

said linear alkenyl having a carbon atom number of 2-5 is particularly a C2, C3, C4 or C5 linear alkenyl, or a C2-C5 linear alkenyl, or a C2-C4 linear alkenyl, or a C2-C3 linear alkenyl, or a C3-C5 linear alkenyl, or a C3-C4 linear alkenyl or a C4-C5 linear alkenyl;

in the definition of $R_4'$ in said formula IV, said linear alkyl having a carbon atom number of 1-7 is particularly a C1, C2, C3, C4, C5, C6 or C7 linear alkyl, or a C1-C6 linear alkyl, or a C1-C5 linear alkyl, or a C1-C4 linear alkyl, or a C1-C3 linear alkyl, or a C1-C2 linear alkyl, or a C2-C5 linear alkyl, or a C2-C4 linear alkyl, or a C2-C3 linear alkyl, or a C3-C5 linear alkyl, or a C3-C4 linear alkyl or a C4-C5 linear alkyl;

said alkoxy having a carbon atom number of 1-7 is particularly a C1, C2, C3, C4, C5, C6 or C7 alkoxy, or a C1-C6 alkoxy, or a C1-C5 alkoxy, or a C1-C4 alkoxy, or a C1-C3 alkoxy, or a C1-C2 alkoxy, or a C2-C5 alkoxy, or a C2-C4 alkoxy, or a C2-C3 alkoxy, or a C3-C5 alkoxy, or a C3-C4 alkoxy or a C4-C5 alkoxy;

in particular, said compound as represented by formula III is selected from at least one of the compounds as represented by formulae III-1 to III-46:
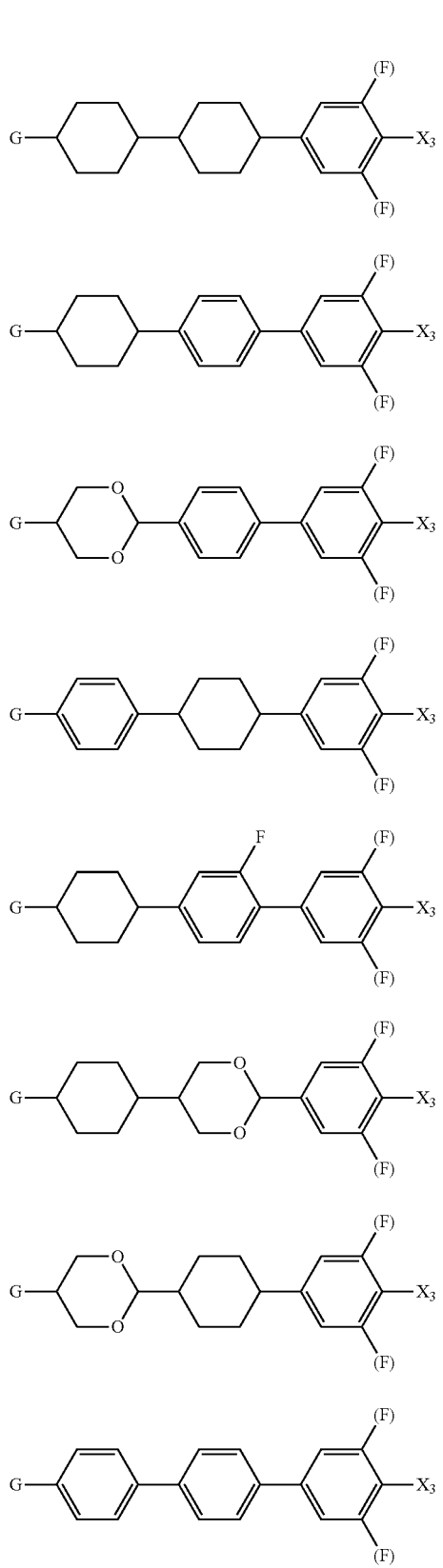
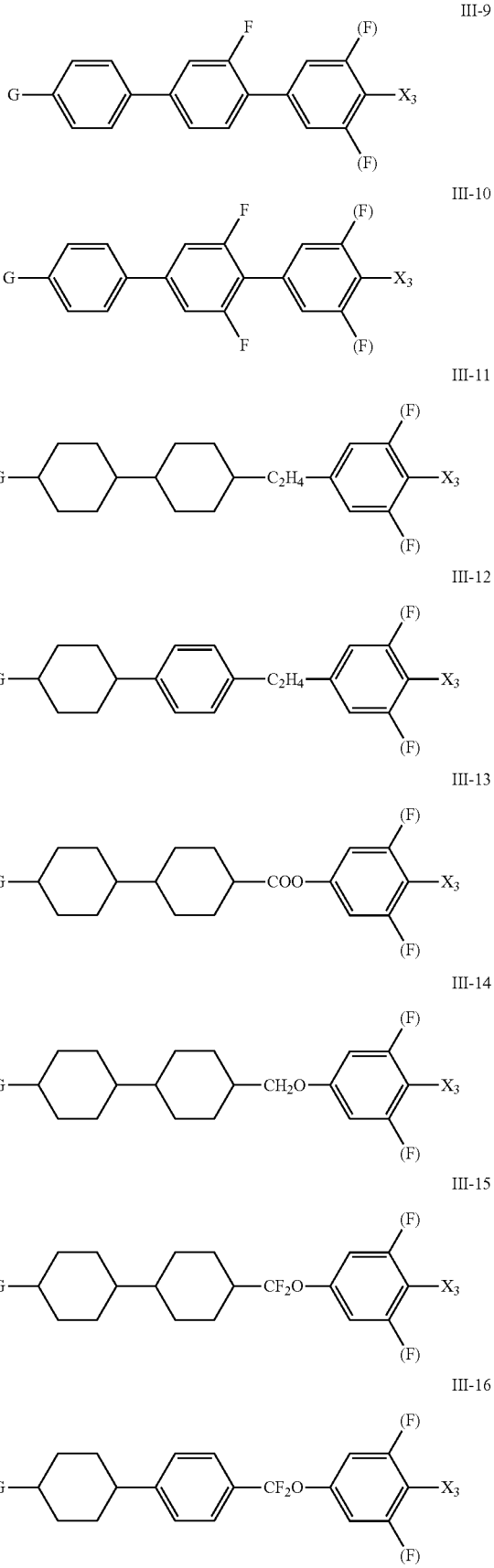

III-17 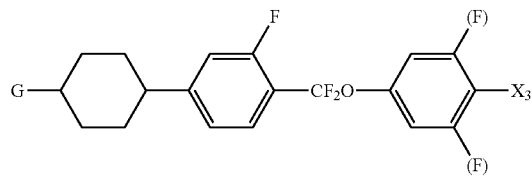
III-18 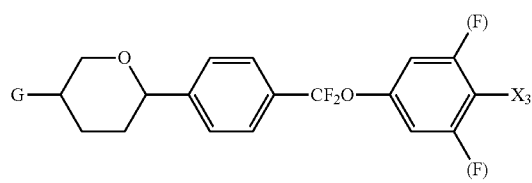
III-19 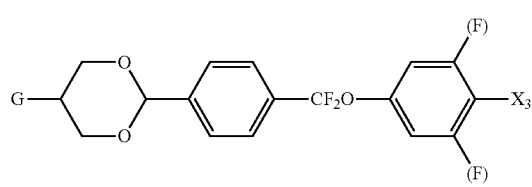
III-20 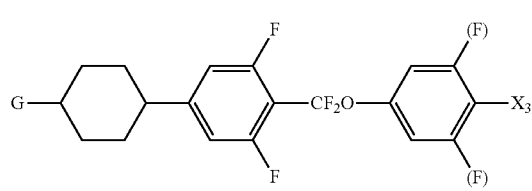
III-21 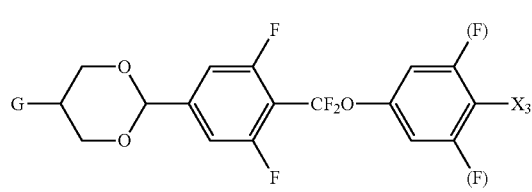
III-22 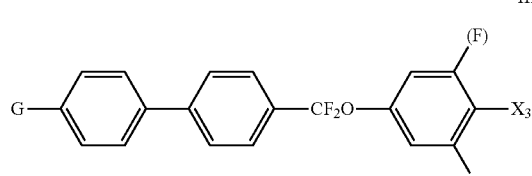
III-23 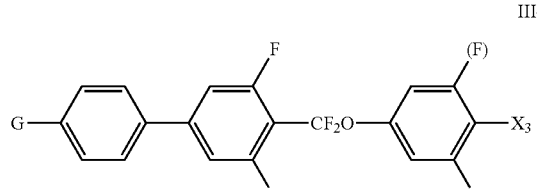
III-24
III-25 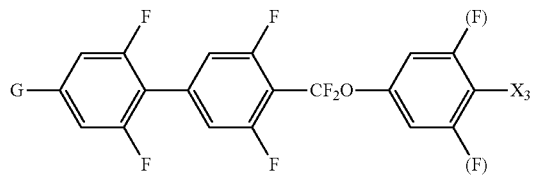
III-26 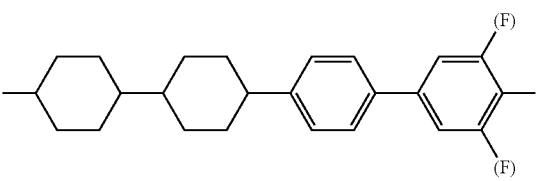
III-27 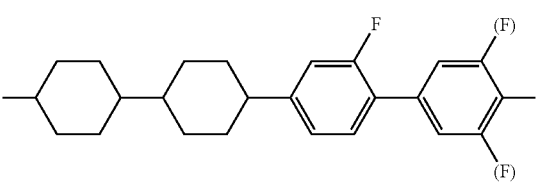
III-28 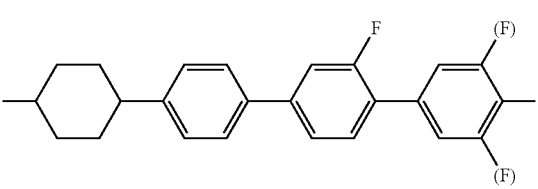
III-29 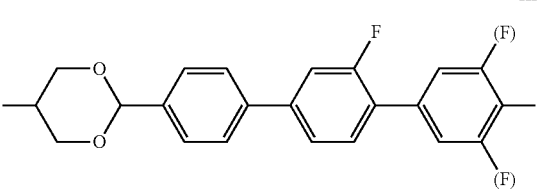
III-30 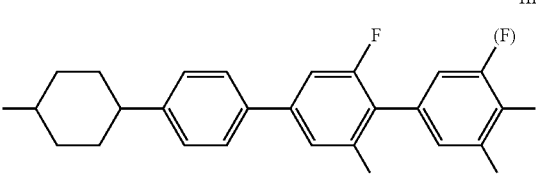
III-31 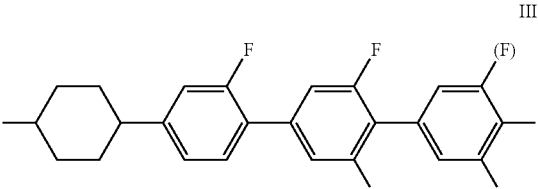
III-32 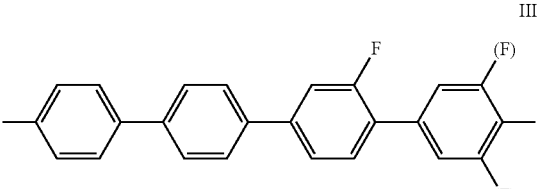

III-33
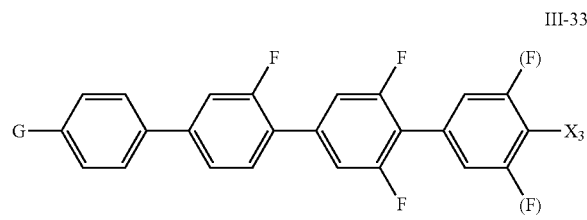
III-34
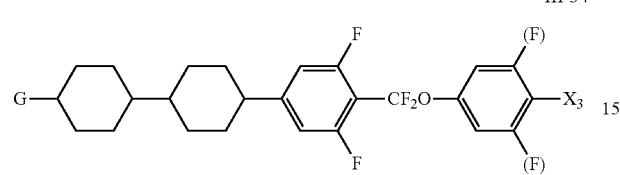
III-35
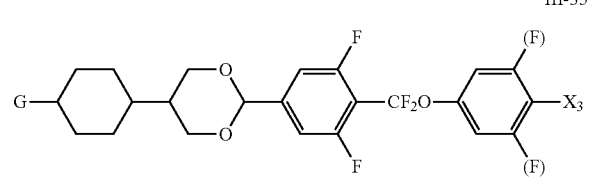
III-36
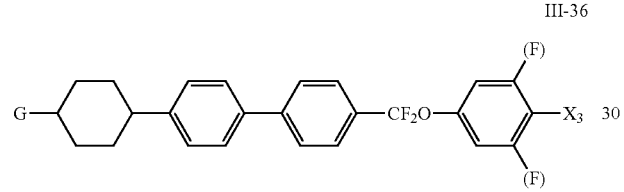
III-37
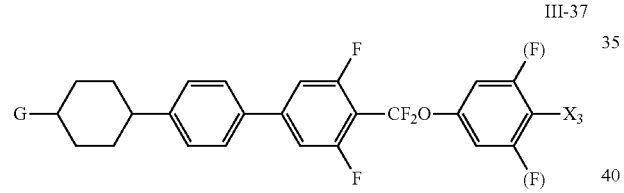
III-38
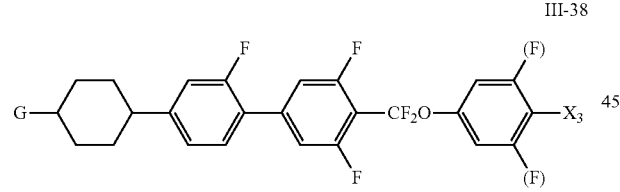
III-39
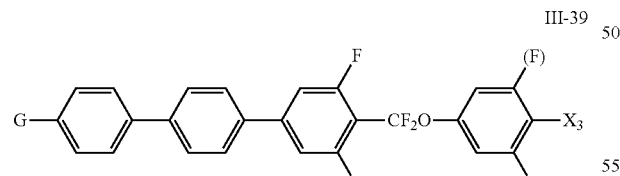
III-40
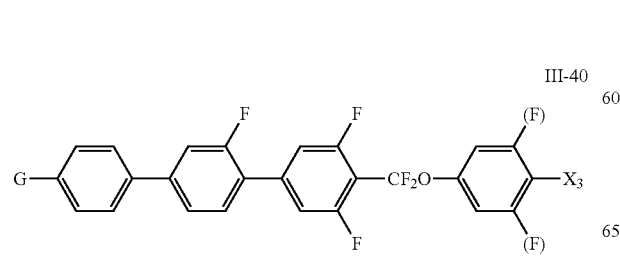
III-41
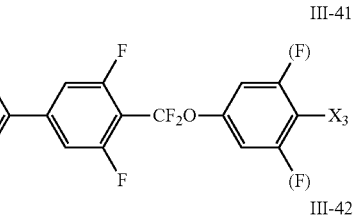
III-42
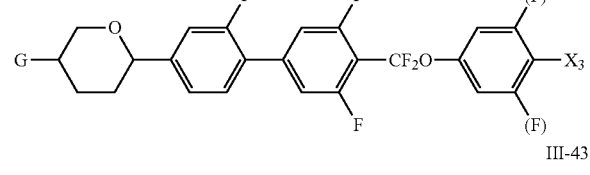
III-43
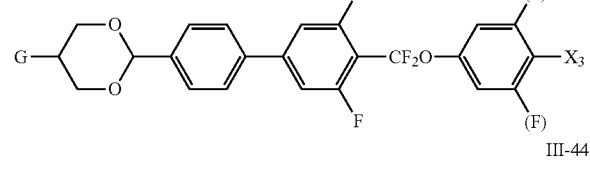
III-44
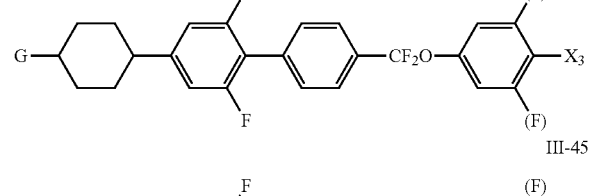
III-45
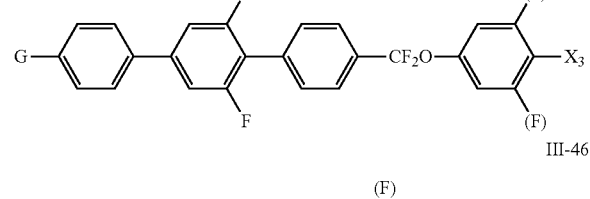
III-46
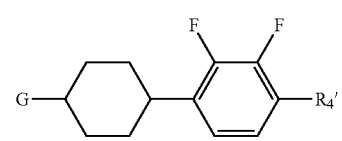
in said formulae III-1 to III-46, the definitions of $X_3$, G and (F) are all the same as the definitions in said formula III; and said compound as represented by formula IV is selected from at least one of the compounds as represented by formulae IV-1 to IV-12:
IV-1
IV-2
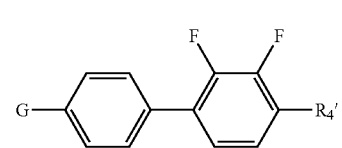

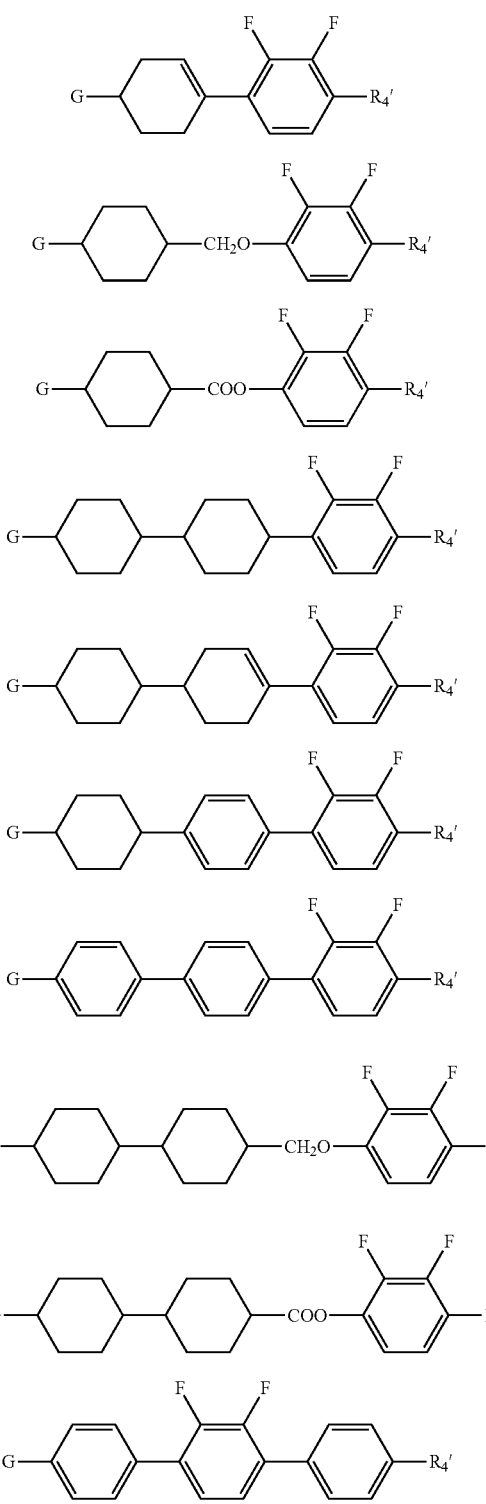

IV-3
IV-4
IV-5
IV-6
IV-7
IV-8
IV-9
IV-10
IV-11
IV-12 in said formulae IV-1 to IV-12, the definitions of G and $R_4'$ are both the same as the definitions in said formula IV.

The above-mentioned liquid crystal composition consists of the above-mentioned component (1), component (2), component (3) or/and component (4);

said component (1) is 1-50 parts, preferably 1-40 parts, and more particularly 1, 2, 5, 6, 8, 10, 12, 15, 17.75, 20, 23, 25, or 35 parts, in part by mass;

and said component (2) is 10-70 parts, preferably 15-60 parts, and more particularly 18, 20, 25, 27, 32, 34, 36, 38, 40, 50, 56, or 57 parts, in part by mass.

said component (3) is 0.1-70 parts, preferably 0.2-65 parts, and particularly 0.25, 9, 30, 46, 49, 58 or 62 parts, in part by mass;

and said component (4) is 30-75 parts, preferably 35-70 parts, and particularly 41, 43, 48, 51, 53 or 65 parts, in part by mass.

Said liquid crystal composition can further comprise a component (5);

said component (5) is selected from at least one of the compounds as represented by formula V;

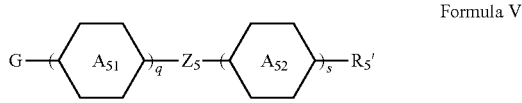

Formula V in said formula V, the definition of G is the same as that of the G in said formula III;

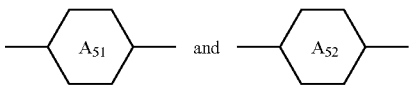

each independently represent

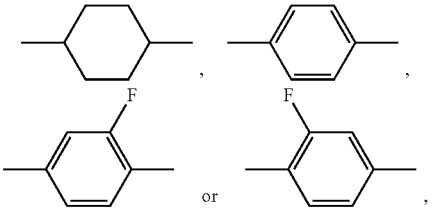

and when q or s=2,

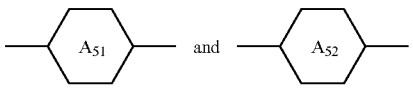

are the same or different;

q and s independently represent 1 or 2, and when q and s are different, q represents 1;

$R_5'$ independently represents a linear alkyl having a carbon atom number of 1-7 or an alkoxy having a carbon atom number of 1-7; and $Z_5$ independently represents —$CH_2$—$CH_2$—, —COO—, trans-CH═CH—, —$CH_2$O— or a single bond.

The above-mentioned liquid crystal composition can also consist of the above-mentioned component (1), component (2), component (3) and component (5), or consist of the above-mentioned component (1), component (2), component (4) and component (5), or consist of the above-mentioned component (1), component (2), component (3), component (4) and component (5);

said component (1) is 1-50 parts, preferably 1-40 parts, and more particularly 1, 2, 5, 6, 8, 10, 12, 15, 17.75, 20, 23, 25, or 35 parts, in part by mass;

and said component (2) is 10-70 parts, preferably 15-60 parts, and more particularly 18, 20, 25, 27, 32, 34, 36, 38, 40, 50, 56, or 57 parts, in part by mass.
said component (3) is 0.1-70 parts, preferably 0.2-65 parts, and particularly 0.25, 9, 30, 46, 49, 58 or 62 parts, in part by mass;
and said component (4) is 30-75 parts, preferably 35-70 parts, and particularly 41, 43, 48, 51, 53 or 65 parts, in part by mass.
said component (5) is 1-30 parts, preferably 1-25 parts, in part by mass.

Said liquid crystal composition can further comprise an additive; said additive is selected from at least one of a UV stabilizer, an antioxidant, a chiral dopant and a polymerization initiator; and said additive is used in an amount of 0.01%-0.5% of the mass of the liquid crystal composition consisting of components (1) to (5).

Most particularly, the above-mentioned liquid crystal composition provided in the present disclosure can be any one of the following liquid crystal compositions a to o:
said liquid crystal composition a comprises or consists of the following various components in parts by mass:
said liquid crystal composition a particularly comprises or consists of the following various components in parts by mass:

| | |
|---|---|
| 5BBB(2F,4F) | 8 |
| 3CB(3F)BC3 | 5 |
| 3CCV1 | 6 |
| 3CCV | 51 |
| 3BB(3F)B(3F,5F)QB(3F,4F,5F) | 6 |
| 4BB(3F)B(3F,5F)QB(3F,4F,5F) | 6 |
| 3BB(3F)B(3F,5F)2V | 12 |
| 5BB(3F)B(3F,5F)QB(3F,4F,5F) | 6 | said liquid crystal composition b comprises or consists of the following various components in parts by mass:

| | |
|---|---|
| 5BBB(2F,4F) | 3-8 |
| 3CCV | 15-20 |
| VCCB1 | 5-10 |
| 1BCC2V | 5-10 |
| 3CCB(3F,4F,5F) | 10-15 |
| 5CCB(3F,4F,5F) | 10 |
| 3CBB(3F,4F,5F) | 3-8 |
| 3CCBB(3F,4F,5F) | 3-8 |
| 2CCBB(3F,4F,5F) | 3-8 |
| 3CCB(3F)B(3F,4F,5F) | 3-8 |
| H(5)BB(3F,5F)QB(3F,4F,5F) | 28-22 | said liquid crystal composition b particularly comprises or consists of the following various components in parts by mass:

| | |
|---|---|
| 5BBB(2F,4F) | 5 |
| 3CCV | 18 |
| VCCB1 | 8 |
| 1BCC2V | 7 |
| 3CCB(3F,4F,5F) | 12 |
| 5CCB(3F,4F,5F) | 10 |
| 3CBB(3F,4F,5F) | 5 |
| 3CCBB(3F,4F,5F) | 5 |
| 2CCBB(3F,4F,5F) | 5 |
| 3CCB(3F)B(3F,4F,5F) | 5 |
| H(5)BB(3F,5F)QB(3F,4F,5F); | 20 | said liquid crystal composition c comprises or consists of the following various components in parts by mass:

| | |
|---|---|
| 3CCB(2F,4F) | 3-8 |
| 3BBB(2F,4F) | 5-10 |
| 3CBB(2F,4F) | 1-5 |
| 3CCV | 28-33 |
| 3CC4 | 8-13 |
| 3CCBOCF$_3$ | 3-8 |
| 3CCBB(3F,4F,5F) | 5-10 |
| 2CCBB(3F,4F,5F) | 5-10 |
| H(5)BB(3F,5F)QB(3F,4F,5F) | 18-23 |
| H(5)BB(3F)B(3F,5F)QB(3F,4F,5F) | 5-10 | said liquid crystal composition c particularly comprises or consists of the following various components in parts by mass:

| | |
|---|---|
| 3CCB(2F,4F) | 5 |
| 3BBB(2F,4F) | 8 |
| 3CBB(2F,4F) | 2 |
| 3CCV | 30 |
| 3CC4 | 10 |
| 3CCBOCF$_3$ | 5 |
| 3CCBB(3F,4F,5F) | 6 |
| 2CCBB(3F,4F,5F) | 6 |
| H(5)BB(3F,5F)QB(3F,4F,5F) | 20 |
| H(5)BB(3F)B(3F,5F)QB(3F,4F,5F) | 8 | said liquid crystal composition d comprises or consists of the following various components in parts by mass:

| | |
|---|---|
| 3CCB(2F,4F) | 1-5 |
| 1OCCB(2F,4F) | 1-5 |
| 3CBB(2F,4F) | 1-5 |
| 3CCV | 20 |
| 3CBO2 | 1-5 |
| 3CC5 | 3-8 |
| 3CCB(4F,5F) | 5-10 |
| 4CCB(4F,5F) | 5-10 |
| 5CCB(4F,5F) | 5-10 |
| 3CBB(4F,5F) | 3-8 |
| 5CBB(4F,5F) | 3-8 |
| H(3)1BB(3F,5F)QB(3F,4F,5F) | 18-23 |
| H(3)1CCBB(3F,4F,5F) | 5-10 |
| 3CB(3F)BC3 | 1-5 |
| 3CBBC3 | 1-5 | said liquid crystal composition d particularly comprises or consists of the following various components in parts by mass:

| | |
|---|---|
| 3CCB(2F,4F) | 4 |
| 1OCCB(2F,4F) | 4 |
| 3CBB(2F,4F) | 4 |
| 3CCV | 20 |
| 3CBO2 | 2 |
| 3CC5 | 5 |
| 3CCB(4F,5F) | 7 |
| 4CCB(4F,5F) | 7 |
| 5CCB(4F,5F) | 7 |
| 3CBB(4F,5F) | 5 |
| 5CBB(4F,5F) | 5 |
| H(3)1BB(3F,5F)QB(3F,4F,5F) | 20 |
| H(3)1CCBB(3F,4F,5F) | 7 |
| 3CB(3F)BC3 | 1.5 |
| 3CBBC3 | 1.5 | said liquid crystal composition e comprises or consists of the following various components in parts by mass:

| | |
|---|---|
| 3BBB(2F,4F) | 5-10 |
| 5BBB(2F,4F) | 5-10 |
| 3OBBB(2F,4F) | 1-5 |
| 1OBBB(2F,4F) | 1-5 |
| 3CCV | 40 |
| 3CCV1 | 5-10 |
| 1BBEV1 | 1-5 |
| H(5)BBB(3F)B(3F,4F,5F) | 1-5 |
| 3CCB(3F)B(3F,4F,5F) | 5-10 |
| H(5)BB(3F,5F)QB(3F,4F,5F) | 10-15 |
| H(5)BB(3F) B(3F,5F)QB(3F,4F,5F) | 8-13 | said liquid crystal composition e particularly comprises or consists of the following various components in parts by mass:

| | |
|---|---|
| 3BBB(2F,4F) | 6 |
| 5BBB(2F,4F) | 6 |
| 3OBBB(2F,4F) | 4 |
| 1OBBB(2F,4F) | 4 |
| 3CCV | 40 |
| 3CCV1 | 6 |
| 1BBEV1 | 4 |
| H(5)BBB(3F)B(3F,4F,5F) | 1 |
| 3CCB(3F)B(3F,4F,5F) | 6 |
| H(5)BB(3F,5F)QB(3F,4F,5F) | 13 |
| H(5)BB(3F) B(3F,5F)QB(3F,4F,5F) | 10 | said liquid crystal composition f comprises or consists of the following various components in parts by mass:

| | |
|---|---|
| 5BBB(2F,4F) | 5-10 |
| 3CCB(2F,4F) | 5-10 |
| 3CPB(2F,4F) | 5-10 |
| 5CC(2F,4F) | 5-10 |
| 5CCV | 13-18 |
| 3CCV1 | 3-8 |
| 2CCB(3F,4F,5F) | 1-5 |
| 3BB(3F,5F)Q B(3F,4F,5F) | 13-18 |
| 3CCQB(3F,4F,5F) | 5-10 |
| 3BB(3F) B(3F,4F,5F) | 3-8 |
| 3CC B(3F) B(3F,4F,5F) | 5-10 |
| 3BB(3F) B(3F,5F)Q B(3F,4F,5F) | 1-5 |
| 4BB(3F) B(3F,5F)Q B(3F,4F,5F) | 1-5 |
| 3BBB(3F)B(3F,4F,5F) | 1-5 |
| VCCB1 | 3-8 |
| 5CBF | 1-5 | said liquid crystal composition f particularly comprises or consists of the following various components in parts by mass:

| | |
|---|---|
| 5BBB(2F,4F) | 7 |
| 3CCB(2F,4F) | 6 |
| 3CPB(2F,4F) | 6 |
| 5CC(2F,4F) | 6 |
| 5CCV | 15 |
| 3CCV1 | 5 |
| 2CCB(3F,4F,5F) | 3 |
| 3BB(3F,5F)Q B(3F,4F,5F) | 15 |
| 3CCQB(3F,4F,5F) | 7 |
| 3BB(3F) B(3F,4F,5F) | 5 |
| 3CC B(3F) B(3F,4F,5F) | 6 |
| 3BB(3F) B(3F,5F)Q B(3F,4F,5F) | 4 |
| 4BB(3F) B(3F,5F)Q B(3F,4F,5F) | 4 |
| 3BBB(3F)B(3F,4F,5F) | 2 |
| VCCB1 | 5 |
| 5CBF | 4 | said liquid crystal composition g comprises or consists of the following various components in parts by mass:

| | |
|---|---|
| 3BBB(2F,4F) | 8-13 |
| 4BBB(2F,4F) | 8-13 |
| 5BBB(2F,4F) | 8-13 |
| 2OBBB(2F,4F) | 3-8 |
| 3CCV | 50-55 |
| 3CCV1 | 1-5 |
| 1BBEV1 | 1-5 |
| H(5)BB(3F,5F)QB(3F,4F,5F) | 1-5 |
| H(5)H[3O]BB(3F,5F)QB(3F,4F,5F) | 1-5 |
| H(5)BBB(3F)B(3F,4F,5F) | 1-5 | said liquid crystal composition g particularly comprises or consists of the following various components in parts by mass:

| | |
|---|---|
| 3BBB(2F,4F) | 10 |
| 4BBB(2F,4F) | 10 |
| 5BBB(2F,4F) | 10 |
| 2OBBB(2F,4F) | 5 |
| 3CCV | 51 |
| 3CCV1 | 3 |
| 1BBEV1 | 2 |
| H(5)BB(3F,5F)QB(3F,4F,5F) | 3 |
| H(5)H[3O]BB(3F,5F)QB(3F,4F,5F) | 3 |
| H(5)BBB(3F)B(3F,4F,5F) | 3 | said liquid crystal composition h comprises or consists of the following various components in parts by mass:

| | |
|---|---|
| 3CBB(2F,4F) | 2 |
| VCCB1 | 2 |
| 3BB(2F)B1H(3) | 7 |
| 3CCV | 40 |
| 3CCBB(3F,4F) | 3 |
| 5CCBB(3F,4F) | 3 |
| H(5)CBB(3F,5F)QB(3F,4F,5F) | 5 |
| H(5)BB(3F,5F)QB(3F,4F,5F) | 20 |
| H(5)BB(3F)B(3F,5F)QB(3F,4F,5F) | 6 |
| H(5)H[3O]BB(3F,5F)QB(3F,4F,5F) | 6 |
| H(5)H[3O,5O]B(3F,5F)QB(3F,4F,5F) | 3 |
| H(5)BBB(3F)B(3F,4F,5F) | 3 | said liquid crystal composition h particularly comprises or consists of the following various components in parts by mass:

| | |
|---|---|
| 3CBB(2F,4F) | 2 |
| VCCB1 | 2 |
| 3BB(2F)B1H(3) | 7 |
| 3CCV | 40 |
| 3CCBB(3F,4F) | 3 |
| 5CCBB(3F,4F) | 3 |
| H(5)CBB(3F,5F)QB(3F,4F,5F) | 5 |
| H(5)BB(3F,5F)QB(3F,4F,5F) | 20 |
| H(5)BB(3F)B(3F,5F)QB(3F,4F,5F) | 6 |
| H(5)H[3O]BB(3F,5F)QB(3F,4F,5F) | 6 |
| H(5)H[3O,5O]B(3F,5F)QB(3F,4F,5F) | 3 |
| H(5)BBB(3F)B(3F,4F,5F) | 3 | said liquid crystal composition i comprises or consists of the following various components in parts by mass:

| | |
|---|---|
| 5BBB(2F,4F) | 5-10 |
| 3BBB(2F,4F) | 5-10 |
| 3CCV | 25-30 |
| 3CCV1 | 1-5 |

-continued

| | |
|---|---|
| 3CB(3F)BC3 | 1-5 |
| 3C1OB(2F,3F)O2 | 3-8 |
| 3CC1OB(2F,3F)O2 | 8-13 |
| 2CC1OB(2F,3F)O2 | 8-13 |
| 5CC1OB(2F,3F)O2 | 8-13 |
| H(5)C1OB(2F,3F)O2 | 10-15 |
| H(5)BBB(3F)B(3F,4F,5F) | 1-5 | said liquid crystal composition i particularly comprises or consists of the following various components in parts by mass:

| | |
|---|---|
| 5BBB(2F,4F) | 9 |
| 3BBB(2F,4F) | 8.75 |
| 3CCV | 28 |
| 3CCV1 | 4 |
| 3CB(3F)BC3 | 2 |
| 3C1OB(2F,3F)O2 | 5 |
| 3CC1OB(2F,3F)O2 | 10 |
| 2CC1OB(2F,3F)O2 | 10 |
| 5CC1OB(2F,3F)O2 | 10 |
| H(5)C1OB(2F,3F)O2 | 13 |
| H(5)BBB(3F)B(3F,4F,5F) | 0.25 | said liquid crystal composition j comprises or consists of the following various components in parts by mass:

| | |
|---|---|
| 5BBB(2F,4F) | 8-13 |
| 3BBB(2F,4F) | 8-13 |
| 3CBB(2F,4F) | 1-5 |
| 5CBB(2F,4F) | 1-5 |
| 3CBO2 | 1-5 |
| 2CC3 | 18-23 |
| 4CC3 | 5-10 |
| 5CC3 | 5-10 |
| 3CBB(2F,3F)O2 | 5-10 |
| 2CBB(2F,3F)O2 | 5-10 |
| H(5)C1OB(2F,3F)O2 | 8-13 |
| 3C1OB(2F,3F)O2 | 5-10 |
| H(5)BB(2F,3F)O2 | 3-8 | said liquid crystal composition j particularly comprises or consists of the following various components in parts by mass:

| | |
|---|---|
| 5BBB(2F,4F) | 10 |
| 3BBB(2F,4F) | 5 |
| 3CBB(2F,4F) | 4 |
| 5CBB(2F,4F) | 4 |
| 3CBO2 | 4 |
| 2CC3 | 20 |
| 4CC3 | 6 |
| 5CC3 | 6 |
| 3CBB(2F,3F)O2 | 9 |
| 2CBB(2F,3F)O2 | 9 |
| H(5)C1OB(2F,3F)O2 | 10 |
| 3C1OB(2F,3F)O2 | 8 |
| H(5)BB(2F,3F)O2 | 5 | said liquid crystal composition k comprises or consists of the following various components in parts by mass:

| | |
|---|---|
| 5BBB(2F,4F) | 1-5 |
| 3CBB2 | 5-10 |
| 5CBB2 | 5-10 |
| 3CB(3F)BC3 | 1-5 |
| 5BB1 | 5-10 |
| 2CC3 | 18-23 |
| 4CC3 | 5-10 |
| 5CC3 | 5-10 |
| 3CC1OB(2F,3F)O2 | 10-15 |
| 2CC1OB(2F,3F)O2 | 10-15 |
| 3BB(2F,3F)O2 | 10-15 |
| 2C1OB(2F,3F)O2 | 5-10 | said liquid crystal composition k particularly comprises or consists of the following various components in parts by mass:

| | |
|---|---|
| 5BBB(2F,4F) | 2 |
| 3CBB2 | 8 |
| 5CBB2 | 8 |
| 3CB(3F)BC3 | 1 |
| 5BB1 | 6 |
| 2CC3 | 20 |
| 4CC3 | 6 |
| 5CC3 | 6 |
| 3CC1OB(2F,3F)O2 | 12 |
| 2CC1OB(2F,3F)O2 | 12 |
| 3BB(2F,3F)O2 | 13 |
| 2C1OB(2F,3F)O2 | 6 | said liquid crystal composition l comprises or consists of the following various components in parts by mass:

| | |
|---|---|
| 5CCB(2F,4F) | 3-8 |
| 3CBB2 | 3-8 |
| 5CBB2 | 3-8 |
| 2CC3 | 18-23 |
| 3CBO2 | 3-8 |
| 3CBB(2F,3F)O2 | 5-10 |
| 2CBB(2F,3F)O2 | 5-10 |
| 3CCB(2F,3F)O2 | 5-10 |
| 5CCB(2F,3F)O2 | 5-10 |
| 3CB(2F,3F)O4 | 13-18 |
| 5CB(2F,3F)O4 | 13-18 | said liquid crystal composition l particularly comprises or consists of the following various components in parts by mass:

| | |
|---|---|
| 5CCB(2F,4F) | 5 |
| 3CBB2 | 5 |
| 5CBB2 | 5 |
| 2CC3 | 20 |
| 3CBO2 | 5 |
| 3CBB(2F,3F)O2 | 9 |
| 2CBB(2F,3F)O2 | 9 |
| 3CCB(2F,3F)O2 | 6 |
| 5CCB(2F,3F)O2 | 6 |
| 3CB(2F,3F)O4 | 15 |
| 5CB(2F,3F)O4 | 15 | said liquid crystal composition m comprises or consists of the following various components in parts by mass:

| | |
|---|---|
| 5BBB(2F,4F) | 8-12 |
| 3CBB2 | 3-8 |
| 3CCV | 30-35 |
| 3CC1OB(2F,3F)O2 | 10-15 |
| 2CC1OB(2F,3F)O2 | 10-15 |
| 5CC1OB(2F,3F)O2 | 3-8 |
| H(5)CBB(2F,3F)O2 | 5-10 |
| H(5)BB(2F,3F)O2 | 3-8 |
| H(5)C1OB(2F,3F)O2 | 10-15 | said liquid crystal composition m particularly comprises or consists of the following various components in parts by mass:

| | |
|---|---|
| 5BBB(2F,4F) | 10 |
| 3CBB2 | 5 |
| 3CCV | 32 |
| 3CC1OB(2F,3F)O2 | 12 |
| 2CC1OB(2F,3F)O2 | 12 |
| 5CC1OB(2F,3F)O2 | 5 |
| H(5)CBB(2F,3F)O2 | 7 |
| H(5)BB(2F,3F)O2 | 5 |
| H(5)C1OB(2F,3F)O2 | 12 | said liquid crystal composition n comprises or consists of the following various components in parts by mass:

| | |
|---|---|
| 3CCB(2F,4F) | 1 |
| 3CCV1 | 8 |
| 5CB3 | 2 |
| 5CC3 | 2 |
| 1BBEV1 | 2 |
| 3CCV | 20 |
| 3CCB(2F,3F)O2 | 5 |
| 3CPB(2F,3F)O2 | 3 |
| 1VCCB(2F,3F)O2 | 5 |
| 2CBB(2F,3F)O2 | 9 |
| 3CBB(2F,3F)O2 | 9 |
| 3BB(2F,3F)O2 | 15 |
| 3CB(2F,3F)O2 | 15 |
| 4CBB(2F,3F)O2 | 4 | said liquid crystal composition n particularly comprises or consists of the following various components in parts by mass:

| | |
|---|---|
| 3CCB(2F,4F) | 1 |
| 3CCV1 | 8 |
| 5CB3 | 2 |
| 5CC3 | 2 |
| 1BBEV1 | 2 |
| 3CCV | 20 |
| 3CCB(2F,3F)O2 | 5 |
| 3CPB(2F,3F)O2 | 3 |
| 1VCCB(2F,3F)O2 | 5 |
| 2CBB(2F,3F)O2 | 9 |
| 3CBB(2F,3F)O2 | 9 |
| 3BB(2F,3F)O2 | 15 |
| 3CB(2F,3F)O2 | 15 |
| 4CBB(2F,3F)O2 | 4 | said liquid crystal composition o comprises or consists of the following various components in parts by mass:

| | |
|---|---|
| 3CPB(2F,4F) | 1-5 |
| 3 3H[3O]BB(2F,4F) | 1-5 |
| 3CCV1 | 3-8 |
| 5CB3 | 1-5 |
| 5CC3 | 5-10 |
| 2CC3 | 15-20 |
| 4CC3 | 5-10 |
| 3CBO2 | 1-5 |
| 3CC1OB(2F,3F)O2 | 10-15 |
| 2CC1OB(2F,3F)O2 | 10-15 |
| 3CB(2F,3F)EB(2F,3F)O2 | 1-5 |
| H(5)CB(2F,3F)O2 | 5-10 |
| H(5)C1OB(2F,3F)O2 | 5-10 |
| 2BB(2F,3F)B4 | 5-10 |
| 2BB(2F,3F)B3 | 5-10 | and said liquid crystal composition o particularly comprises or consists of the following various components in parts by mass:

| | |
|---|---|
| 3CPB(2F,4F) | 3 |
| 3 3H[3O]BB(2F,4F) | 3 |
| 3CCV1 | 5 |
| 5CB3 | 3 |
| 5CC3 | 7 |
| 2CC3 | 19 |
| 4CC3 | 7 |
| 3CBO2 | 2 |
| 3CC1OB(2F,3F)O2 | 11 |
| 2CC1OB(2F,3F)O2 | 11 |
| 3CB(2F,3F)EB(2F,3F)O2 | 3 |
| H(5)CB(2F,3F)O2 | 7 |
| H(5)C1OB(2F,3F)O2 | 7 |
| 2BB(2F,3F)B4 | 6 |
| 2BB(2F,3F)B3 | 6. |

Furthermore, the use of the above-mentioned liquid crystal composition provided in the present disclosure in the preparation of an active matrix display element and an active matrix display element comprising the above-mentioned liquid crystal composition also falls within the scope of protection of the present disclosure.

The liquid crystal medium provided in the present disclosure has excellent performance and an optical anisotropy within a range of 0.080-0.150, and has a wide nematic temperature range, a low rotary viscosity, a relatively fast response time and good chemical, light and thermal stability; the liquid crystal medium contains one or more compounds with a 2,4-diflurophenyl, and the compound has good normal temperature miscibility at a low temperature and chemical and thermal stability, is very suitable for manufacturing a liquid crystal display element, and especially an active matrix display element, such as an active matrix display in a TN, FFS or IPS mode. The performance parameters required for a display are achieved by the compounds of general formulae I and II in the present disclosure, with optimizing a combination and optimizing a ratio, and additionally using other several or even dozens of characteristic liquid crystal compounds to mix, and as a result, the display has the features, such as a low viscosity, an appropriate cleaning point, good chemical and thermal stability, etc., and thus, a new liquid crystal display material with excellent performances is developed.

PARTICULAR EMBODIMENTS

The present disclosure is further described as below in combination with particular embodiments, but the present disclosure is not limited to the following embodiments. Said methods, if not otherwise indicated, are all conventional methods. Said raw materials, if not otherwise indicated, can all be available through public commercial approaches.

The parts involved in the following embodiments are all weight percentage contents, the unit of temperature is ° C., and the particular meanings of other symbols and test conditions are as follows:

S—N represents the melting point (° C.) of the liquid crystal from a crystal state to a nematic phase;

Cp represents the clearing point of a liquid crystal (° C.), Test instrument: a Mettler-Toledo-FP System microscopic thermal analyzer;

$\gamma 1$ is the rotary viscosity (mPa·s), and the test conditions are 25° C., INSTEC:ALCT-IR1, and a 20 micron parallel cell or a 18 micron perpendicular cell;

$K_{11}$ is the twisted elastic constant, $K_{33}$ is the splay elastic constant, and the test conditions are 25° C., INSTEC:ALCT-IR1, and a 20 micron parallel cell or a 18 micron perpendicular cell;

Δε represents the dielectric anisotropy, $\Delta\varepsilon=\varepsilon_{//}-\varepsilon_{\perp}$, wherein $\varepsilon_{//}$ is a dielectric constant parallel to a molecular axis, and $\varepsilon_{\perp}$ is a dielectric constant perpendicular to the molecular axis, and the test conditions are 25° C., INSTEC:ALCT-IR1, and a 20 micron parallel cell or a 18 micron perpendicular cell;

and Δn represents the optical anisotropy, $\Delta n=n_o-n_e$, wherein $n_o$ is the refractive index of an ordinary light, and $n_e$ is the refractive index of an extraordinary light, and the test conditions are 589 nm, and 25±0.2° C.

The liquid crystal mediums are prepared by weighting the liquid crystal compounds at a ratio, respectively, in the following examples 1-15. The various liquid crystal monomers used can all be synthesized by commonly known methods or obtained by commercial approaches.

The apparatus and instruments used for preparing the liquid crystal medium are:

(1) an electronic precision balance (accuracy: 0.1 mg)
(2) a stainless steel beaker: for weighting a liquid crystal
(3) a spoon: for adding a monomer
(4) a magnetic rotor: for stirring, and
(5) a temperature-controlled electromagnetic stirrer.

A method for preparing the liquid crystal medium comprises the following steps:

(1) putting the monomers used in order according to a sequence;
(2) placing the stainless steel beaker on the balance, and adding a monomer into the stainless steel beaker using a small spoon;
(3) successively adding monomer liquid crystals in a required weight;
(4) placing the charged stainless steel beaker on the magnetic stirring instrument to heat and melt; and
(5) after most of the mixture in the stainless steel beaker melting, adding a magnetic rotor into the stainless steel beaker, uniformly mixing the liquid crystal mixture, and cooling to room temperature to obtain the liquid crystal medium.

In the liquid crystal monomer structures represented by codes in the present disclosure, the code representation method for the liquid crystal ring structures, terminal groups and linking groups are shown in tables 1 and 2.

TABLE 1

Corresponding code for the ring structure

| Ring structure | Corresponding code |
|---|---|
|  | C |
|  | B |
|  | P |

TABLE 1-continued

Corresponding code for the ring structure

| Ring structure | Corresponding code |
|---|---|
| 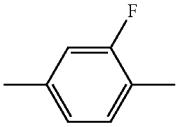 | B(3F) |
| 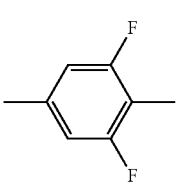 | B(3F,5F) |
| 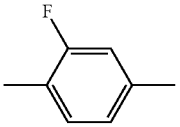 | B(2F) |
| 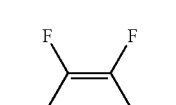 | B(2F,3F) |
| 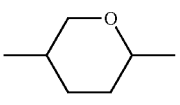 | H[3O] |
| 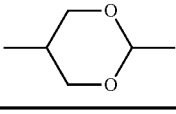 | H[3O,5O] |

TABLE 2

Corresponding code for the terminal group and linking group

| Terminal group and linking group | Corresponding code |
|---|---|
| $C_nH_{2n+1}-$ | n- |
| $C_nH_{2n+1}O-$ | nO— |
| $-OCF_3$ | $-OCF_3$ |
| $-CF_2O-$ | —Q— |
| —F | —F |
| —CN | —CN |
| $-CH_2CH_2-$ | —E— |
| —CH=CH— | —V— |
| —C≡C— | —W— |
| —COO— | —COO— |
| $-CH=CH-C_nH_{2n+1}$ | Vn- |
| 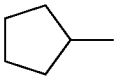 | H(5)— |
| 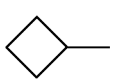 | H(4)— |
|  | H(3)— |

For example:

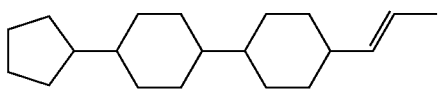 [SMILES: C/C=C/C1CCC(C2CCC(C3CCCC3)CC2)CC1]

has a corresponding code of H(5)CCV1;
and

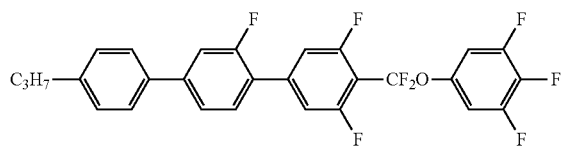

has a corresponding code of 3B B(3F) B(3F,5F)Q B(3F,4F, 5F).

The various components shown in tables 1-15 are mixed uniformly, respectively, to obtain liquid crystal composition a to composition o provided in the present disclosure successively.

In addition, the obtained liquid crystal composition a to composition o are filled between two substrates of a liquid crystal display for performing a performance test, respectively, and the test results of the performance parameters of the obtained liquid crystal compositions are all listed in the corresponding tables.

TABLE 1

The proportions of the components of the liquid crystal composition a obtained in example 1 and the performance parameters thereof

| compound general formula | structural formula of liquid crystal | weight percentage content (%) | performance parameters |
|---|---|---|---|
| III | 5BBB(2F,4F) | 8 | S-N: ≤-40° C. |
| III | 3CB(3F)BC3 | 5 | Cp: 75° C. |
| III | 3CCV1 | 6 | $\gamma_1$: 55 mPa · s |
| III | 3CCV | 51 | Δn: 0.110 |
| III | 3BB(3F)B(3F,5F)QB(3F,4F,5F) | 6 | $n_e$: 1.595 |
| III | 4BB(3F)B(3F,5F)QB(3F,4F,5F) | 6 | Δε: 5.1 |
| III | 3BB(3F)B(3F,5F)2V | 12 | $\varepsilon_\perp$: 3.0 |
| III | 5BB(3F)B(3F,5F)QB(3F,4F,5F) | 6 | $K_1/K_3$: 12.8/13.3 |

TABLE 2

The proportions of the components of the liquid crystal composition b obtained in example 2 and the performance parameters thereof

| compound general formula | structural formula of liquid crystal | weight percentage content (%) | performance parameters |
|---|---|---|---|
| III | 5BBB(2F,4F) | 5 | S-N: ≤-40° C. |
| III | 3CCV | 18 | Cp: 95° C. |
| III | VCCB1 | 8 | $\gamma_1$: 112 mPa · s |
| III | 1BCC2V | 7 | Δn: 0.113 |
| III | 3CCB(3F,4F,5F) | 12 | $n_e$: 1.602 |
| III | 5CCB(3F,4F,5F) | 10 | Δε: 10.1 |
| III | 3CBB(3F,4F,5F) | 5 | $\varepsilon_\perp$: 3.5 |
| III | 3CCBB(3F,4F,5F) | 5 | $K_1/K_3$: 13.5/15.9 |
| III | 2CCBB(3F,4F,5F) | 5 | |

TABLE 2-continued

The proportions of the components of the liquid crystal composition b obtained in example 2 and the performance parameters thereof

| compound general formula | structural formula of liquid crystal | weight percentage content (%) | performance parameters |
|---|---|---|---|
| III | 3CCB(3F)B(3F,4F,5F) | 5 | |
| III | H(5)BB(3F,5F)QB(3F,4F,5F) | 20 | |

TABLE 3

The proportions of the components of the liquid crystal composition c obtained in example 3 and the performance parameters thereof

| compound general formula | structural formula of liquid crystal | weight percentage content (%) | performance parameters |
|---|---|---|---|
| I | 3CCB(2F,4F) | 5 | S-N: ≤-40° C. |
| I | 3BBB(2F,4F) | 8 | Cp: 85° C. |
| I | 3CBB(2F,4F) | 2 | $\gamma_1$: 70 mPa · s |
| II | 3CCV | 30 | Δn: 0.110 |
| II | 3CC4 | 10 | $n_e$: 1.596 |
| III | 3CCBOCF$_3$ | 5 | Δε: 9.1 |
| III | 3CCBB(3F,4F,5F) | 6 | $\varepsilon_\perp$: 3.4 |
| III | 2CCBB(3F,4F,5F) | 6 | $K_1/K_3$: 13.7/14.3 |
| III | H(5)BB(3F,5F)QB(3F,4F,5F) | 20 | |
| III | H(5)BB(3F)B(3F,5F)QB(3F,4F,5F) | 8 | |

TABLE 4

The proportions of the components of the liquid crystal composition d obtained in example 4 and the performance parameters thereof

| compound general formula | structural formula of liquid crystal | weight percentage content (%) | performance parameters |
|---|---|---|---|
| I | 3CCB(2F,4F) | 4 | S-N: ≤-40° C. |
| I | 1OCCB(2F,4F) | 4 | Cp: 90° C. |
| I | 3CBB(2F,4F) | 4 | $\gamma_1$: 92 mPa · s |
| II | 3CCV | 20 | Δn: 0.100 |
| II | 3CBO2 | 2 | $n_e$: 1.588 |
| II | 3CC5 | 5 | Δε: 7.0 |
| III | 3CCB(4F,5F) | 7 | $\varepsilon_\perp$: 3.6 |
| III | 4CCB(4F,5F) | 7 | $K_1/K_3$: 12.2/15.0 |
| III | 5CCB(4F,5F) | 7 | |
| III | 3CBB(4F,5F) | 5 | |
| III | 5CBB(4F,5F) | 5 | |
| III | H(3)1BB(3F,5F)QB(3F,4F,5F) | 20 | |
| III | H(3)1CCBB(3F,4F,5F) | 7 | |
| V | 3CB(3F)BC3 | 1.5 | |
| V | 3CBBC3 | 1.5 | |

TABLE 5

The proportions of the components of the liquid crystal composition e obtained in example 5 and the performance parameters thereof

| compound general formula | structural formula of liquid crystal | weight percentage content (%) | performance parameters |
|---|---|---|---|
| I | 3BBB(2F,4F) | 6 | S-N: ≤-30° C. |
| I | 5BBB(2F,4F) | 6 | Cp: 75° C. |
| I | 3OBBB(2F,4F) | 4 | $\gamma_1$: 56 mPa · s |
| I | 1OBBB(2F,4F) | 4 | Δn: 0.125 |

TABLE 5-continued

The proportions of the components of the liquid crystal composition e obtained in example 5 and the performance parameters thereof

| compound general formula | structural formula of liquid crystal | weight percentage content (%) | performance parameters |
|---|---|---|---|
| II | 3CCV | 40 | $n_e$: 1.615 |
| II | 3CCV1 | 6 | $\Delta\varepsilon$: 6.6 |
| II | 1BBEV1 | 4 | $\varepsilon_\perp$: 3.2 |
| III | H(5)BBB(3F)B(3F,4F,5F) | 1 | $K_1/K_3$: 12.1/14.9 |
| III | 3CCB(3F)B(3F,4F,5F) | 6 | |
| III | H(5)BB(3F,5F)QB(3F,4F,5F) | 13 | |
| III | H(5)BB(3F) | 10 | |

TABLE 6

The proportions of the components of the liquid crystal composition f obtained in example 6 and the performance parameters thereof

| compound general formula | structural formula of liquid crystal | weight percentage content (%) | performance parameters |
|---|---|---|---|
| I | 5BBB(2F,4F) | 7 | S-N: ≤−30° C. |
| I | 3CCB(2F,4F) | 6 | Cp: 87° C. |
| I | 3CPB(2F,4F) | 6 | $\gamma_1$: 88 mPa·s |
| I | 5CC(2F,4F) | 6 | $\Delta n$: 0.120 |
| II | 5CCV | 15 | $n_e$: 1.608 |
| II | 3CCV1 | 5 | $\Delta\varepsilon$: 10.5 |
| III | 2CCB(3F,4F,5F) | 3 | $\varepsilon_\perp$: 3.7 |
| III | 3BB(3F,5F)Q B(3F,4F,5F) | 15 | $K_1/K_3$: 12.8/14.6 |
| III | 3CCQB(3F,4F,5F) | 7 | |
| III | 3BB(3F) B(3F,4F,5F) | 5 | |
| III | 3CC B(3F) B(3F,4F,5F) | 6 | |
| III | 3BB(3F) B(3F,5F)Q | 4 | |
| III | 4BB(3F) B(3F,5F)Q | 4 | |
| III | 3BBB(3F)B(3F,4F,5F) | 2 | |
| V | VCCB1 | 5 | |
| III | 5CBF | 4 | |

TABLE 7

The proportions of the components of the liquid crystal composition g obtained in example 7 and the performance parameters thereof

| compound general formula | structural formula of liquid crystal | weight percentage content (%) | performance parameters |
|---|---|---|---|
| I | 3BBB(2F,4F) | 10 | S-N: ≤−30° C. |
| I | 4BBB(2F,4F) | 10 | Cp: 75° C. |
| I | 5BBB(2F,4F) | 10 | $\gamma_1$: 50 mPa·s |
| I | 2OBBB(2F,4F) | 5 | $\Delta n$: 0.120 |
| II | 3CCV | 51 | $n_e$: 1.608 |
| II | 3CCV1 | 3 | $\Delta\varepsilon$: 2.2 |
| II | 1BBEV1 | 2 | $\varepsilon_\perp$: 2.8 |
| III | H(5)BB(3F,5F)QB(3F,4F,5F) | 3 | $K_1/K_3$: 12.8/12.4 |
| III | H(5)H[3O]BB(3F,5F)QB(3F,4F,5F) | 3 | |
| III | H(5)BBB(3F)B(3F,4F,5F) | 3 | |

TABLE 8

The proportions of the components of the liquid crystal composition h obtained in example 8 and the performance parameters thereof

| compound general formula | structural formula of liquid crystal | weight percentage content (%) | performance parameters |
|---|---|---|---|
| I | 3CBB(2F,4F) | 2 | S-N: ≤−30° C. |
| V | VCCB1 | 2 | Cp: 75° C. |
| V | 3BB(2F)B1H(3) | 7 | $\gamma_1$: 80 mPa·s |
| II | 3CCV | 40 | $\Delta n$: 0.118 |
| III | 3CCBB(3F,4F) | 3 | $n_e$: 1.608 |
| III | 5CCBB(3F,4F) | 3 | $\Delta\varepsilon$: 11.6 |
| III | H(5)CBB(3F,5F)QB(3F,4F,5F) | 5 | $\varepsilon_\perp$: 3.9 |
| III | H(5)BB(3F,5F)QB(3F,4F,5F) | 20 | $K_1/K_3$: 10.7/11.2 |
| III | H(5)BB(3F)B(3F,5F)QB(3F,4F,5F) | 6 | |
| III | H(5)H[3O]BB(3F,5F)QB(3F,4F,5F) | 6 | |
| III | H(5)H[3O,5O]B(3F,5F)QB(3F,4F,5F) | 3 | |
| III | H(5)BBB(3F)B(3F,4F,5F) | 3 | |

TABLE 9

The proportions of the components of the liquid crystal composition i obtained in example 9 and the performance parameters thereof

| compound general formula | structural formula of liquid crystal | weight percentage content (%) | performance parameters |
|---|---|---|---|
| I | 5BBB(2F,4F) | 9 | S-N: ≤−30° C. |
| I | 3BBB(2F,4F) | 8.75 | Cp: 83° C. |
| II | 3CCV | 28 | $\gamma_1$: 125 mPa·s |
| II | 3CCV1 | 4 | $\Delta n$: 0.106 |
| V | 3CB(3F)BC3 | 2 | $n_e$: 1.591 |
| IV | 3C1OB(2F,3F)O2 | 5 | $\Delta\varepsilon$: −4.1 |
| IV | 3CC1OB(2F,3F)O2 | 10 | $\varepsilon_\perp$: 8.2 |
| IV | 2CC1OB(2F,3F)O2 | 10 | $K_1/K_3$: 15.4/17.9 |
| IV | 5CC1OB(2F,3F)O2 | 10 | |
| IV | H(5)C1OB(2F,3F)O2 | 13 | |
| III | H(5)BBB(3F)B(3F,4F,5F) | 0.25 | |

TABLE 10

The proportions of the components of the liquid crystal composition j obtained in example 10 and the performance parameters thereof

| compound general formula | structural formula of liquid crystal | weight percentage content (%) | performance parameters |
|---|---|---|---|
| I | 5BBB(2F,4F) | 10 | S-N: ≤−40° C. |
| I | 3BBB(2F,4F) | 5 | Cp: 71° C. |
| I | 3CBB(2F,4F) | 4 | $\gamma_1$: 94 mPa·s |
| I | 5CBB(2F,4F) | 4 | $\Delta n$: 0.117 |
| II | 3CBO2 | 4 | $n_e$: 1.609 |
| II | 2CC3 | 20 | $\Delta\varepsilon$: −2.4 |
| II | 4CC3 | 6 | $\varepsilon_\perp$: 6.3 |
| II | 5CC3 | 6 | $K_1/K_3$: 14.4/13.5 |
| IV | 3CBB(2F,3F)O2 | 9 | |
| IV | 2CBB(2F,3F)O2 | 9 | |
| IV | H(5)C1OB(2F,3F)O2 | 10 | |
| IV | 3C1OB(2F,3F)O2 | 8 | |
| IV | H(5)BB(2F,3F)O2 | 5 | |

TABLE 11

The proportions of the components of the liquid crystal composition k obtained in example 11 and the performance parameters thereof

| compound general formula | structural formula of liquid crystal | weight percentage content (%) | performance parameters |
|---|---|---|---|
| I | 5BBB(2F,4F) | 2 | S-N: ≤−30° C. |
| V | 3CBB2 | 8 | Cp: 75° C. |
| V | 5CBB2 | 8 | $\gamma_1$: 90 mPa · s |
| V | 3CB(3F)BC3 | 1 | $\Delta n$: 0.101 |
| II | 5BB1 | 6 | $n_e$: 1.589 |
| II | 2CC3 | 20 | $\Delta\varepsilon$: −2.8 |
| II | 4CC3 | 6 | $\varepsilon_\perp$: 6.5 |
| II | 5CC3 | 6 | $K_1/K_3$: 14.3/14.5 |
| IV | 3CC1OB(2F,3F)O2 | 12 | |
| IV | 2CC1OB(2F,3F)O2 | 12 | |
| IV | 3BB(2F,3F)O2 | 13 | |
| IV | 2C1OB(2F,3F)O2 | 6 | |

TABLE 12

The proportions of the components of the liquid crystal composition l obtained in example 12 and the performance parameters thereof

| compound general formula | structural formula of liquid crystal | weight percentage content (%) | performance parameters |
|---|---|---|---|
| I | 5CCB(2F,4F) | 5 | S-N: ≤−40° C. |
| V | 3CBB2 | 5 | Cp: 77° C. |
| V | 5CBB2 | 5 | $\gamma_1$: 115 mPa · s |
| II | 2CC3 | 20 | $\Delta n$: 0.100 |
| II | 3CBO2 | 5 | $n_e$: 1.584 |
| IV | 3CBB(2F,3F)O2 | 9 | $\Delta\varepsilon$: −3.4 |
| IV | 2CBB(2F,3F)O2 | 9 | $\varepsilon_\perp$: 7.0 |
| IV | 3CCB(2F,3F)O2 | 6 | $K_1/K_3$: 13.5/13.7 |
| IV | 5CCB(2F,3F)O2 | 6 | |
| IV | 3CB(2F,3F)O4 | 15 | |
| IV | 5CB(2F,3F)O4 | 15 | |

TABLE 13

The proportions of the components of the liquid crystal composition m obtained in example 13 and the performance parameters thereof

| compound general formula | structural formula of liquid crystal | weight percentage content (%) | performance parameters |
|---|---|---|---|
| I | 5BBB(2F,4F) | 10 | S-N: ≤−40° C. |
| V | 3CBB2 | 5 | Cp: 88° C. |
| II | 3CCV | 32 | $\gamma_1$: 130 mPa · s |
| IV | 3CC1OB(2F,3F)O2 | 12 | $\Delta n$: 0.108 |
| IV | 2CC1OB(2F,3F)O2 | 12 | $n_e$: 1.594 |
| IV | 5CC1OB(2F,3F)O2 | 5 | $\Delta\varepsilon$: −3.9 |
| IV | H(5)CBB(2F,3F)O2 | 7 | $\varepsilon_\perp$: 7.8 |
| IV | H(5)BB(2F,3F)O2 | 5 | $K_1/K_3$: 17.0/17.7 |
| IV | H(5)C1OB(2F,3F)O2 | 12 | |

TABLE 14

The proportions of the components of the liquid crystal composition n obtained in example 14 and the performance parameters thereof

| compound general formula | structural formula of liquid crystal | weight percentage content (%) | performance parameters |
|---|---|---|---|
| I | 3CCB(2F,4F) | 1 | S-N: ≤−40° C. |
| II | 3CCV1 | 8 | Cp: 71° C. |
| II | 5CB3 | 2 | $\gamma_1$: 82 mPa · s |
| II | 5CC3 | 2 | $\Delta n$: 0.110 |
| II | 1BBEV1 | 2 | $n_e$: 1.594 |
| II | 3CCV | 20 | $\Delta\varepsilon$: −3.9 |
| IV | 3CCB(2F,3F)O2 | 5 | $\varepsilon_\perp$: 7.8 |
| IV | 3CPB(2F,3F)O2 | 3 | $K_1/K_3$: 13.3/15.3 |
| IV | 1VCCB(2F,3F)O2 | 5 | |
| IV | 2CBB(2F,3F)O2 | 9 | |
| IV | 3CBB(2F,3F)O2 | 9 | |
| IV | 3BB(2F,3F)O2 | 15 | |
| IV | 3CB(2F,3F)O2 | 15 | |
| IV | 4CBB(2F,3F)O2 | 4 | |

TABLE 15

The proportions of the components of the liquid crystal composition o obtained in example 15 and the performance parameters thereof

| compound general formula | structural formula of liquid crystal | weight percentage content (%) | performance parameters |
|---|---|---|---|
| I | 3CPB(2F,4F) | 3 | S—N: ≤−30° C. |
| I | 3 3H[3O]BB(2F,4F) | 3 | Cp: 75° C. |
| II | 3CCV1 | 5 | $\gamma_1$: 88 mPa · s |
| II | 5CB3 | 3 | $\Delta n$: 0.094 |
| II | 5CC3 | 7 | $n_e$: 1.575 |
| II | 2CC3 | 19 | $\Delta\varepsilon$: −3.0 |
| II | 4CC3 | 7 | $\varepsilon_\perp$: 6.3 |
| II | 3CBO2 | 2 | $K_1/K_3$: 15.0/14.8 |
| IV | 3CC1OB(2F,3F)O2 | 11 | |
| IV | 2CC1OB(2F,3F)O2 | 11 | |
| IV | 3CB(2F,3F)EB(2F,3F)O2 | 3 | |
| IV | H(5)CB(2F,3F)O2 | 7 | |
| IV | H(5)C1OB(2F,3F)O2 | 7 | |
| IV | 2BB(2F,3F)B4 | 6 | |
| IV | 2BB(2F,3F)B3 | 6 | |

It can be seen from the foregoing that the above-mentioned liquid crystal composition provided in the present disclosure has excellent performance and an optical anisotropy within a range of 0.080-0.150, and has a wide nematic temperature range, a low rotary viscosity, a relatively fast response time and good chemical, light and thermal stability; the liquid crystal medium contains one or more compounds with a 2,4-diflurophenyl, the compound has a good normal temperature miscibility at a low temperature and chemical and thermal stability, is very suitable for manufacturing a liquid crystal display element, especially an active matrix display element, such as an active matrix display in a TN, FFS or IPS mode.

The invention claimed is:

1. A liquid crystal composition, comprising components (1) and (2),
wherein said component (1) is composed of at least one of the compounds as represented by formula I;
said component (2) is composed of at least one of the compounds as represented by formula II;

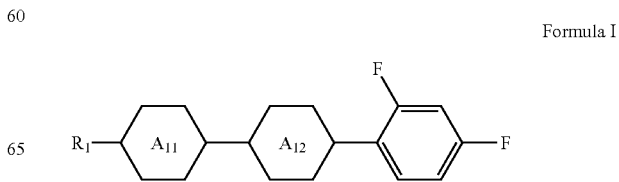

Formula I

-continued

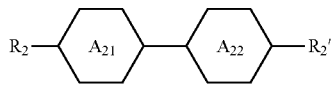
Formula II in said formulae I and II,

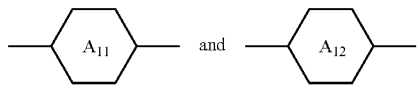

are both:

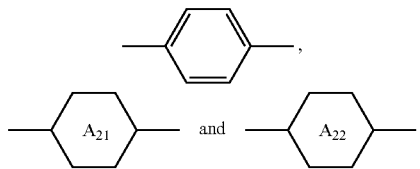

each independently represent

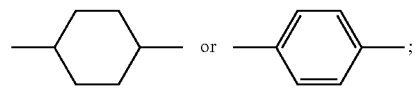

$R_1$ independently represents a linear alkyl having a carbon atom number of 1-7 or a group obtained by replacing at least one —$CH_2$— in said linear alkyl having a carbon atom number of 1-7 with —O— or —CH=CH—;
and $R_2$ and $R_2'$ represent a linear alkyl having a carbon atom number of 1-7, an alkoxy having a carbon atom number of 1-7 or a linear alkenyl having a carbon atom number of 2-5.

2. The liquid crystal composition according to claim 1, wherein said component (1) is 1-50 parts, preferably 1-40 parts, in parts by mass;
and said component (2) is 10-70 parts, preferably 15-60 parts, in parts by mass.

3. The liquid crystal composition according to claim 2, wherein said compound as represented by formula I is:

I-8

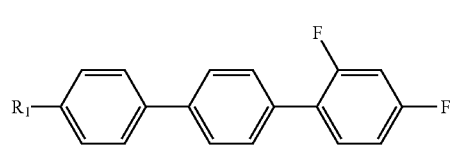

said compound as represented by formula II is selected from any one of the compounds as represented by formulae II-1 to II-9:

II-1

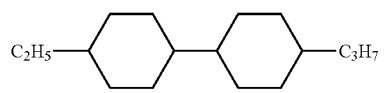

II-2

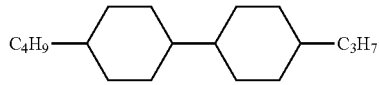

II-3

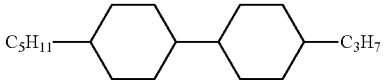

II-4, II-5

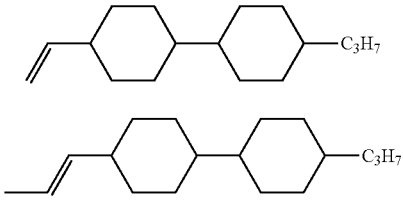

II-6

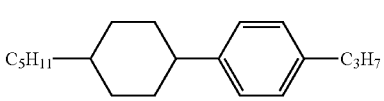

II-7

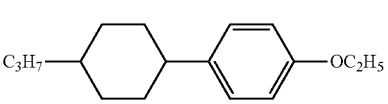

II-8

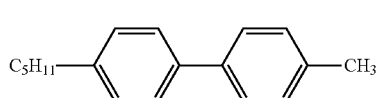

II-9

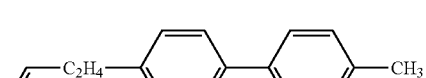

and in said formulae II-1 to II-9, the definition of $R_1$ is the same as that of said $R_1$ in claim 1.

4. The liquid crystal composition according to claim 3, wherein said liquid crystal composition further comprises a component (3) having a dielectric anisotropy of >0 or/and a component (4) having a dielectric anisotropy of <0;
said component (3) is selected from at least one of the compounds as represented by formula III;
said component (4) is selected from at least one of the compounds as represented by formula IV:

Formula III

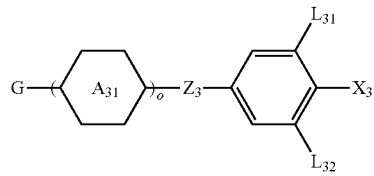

in said formula III,

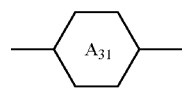

is

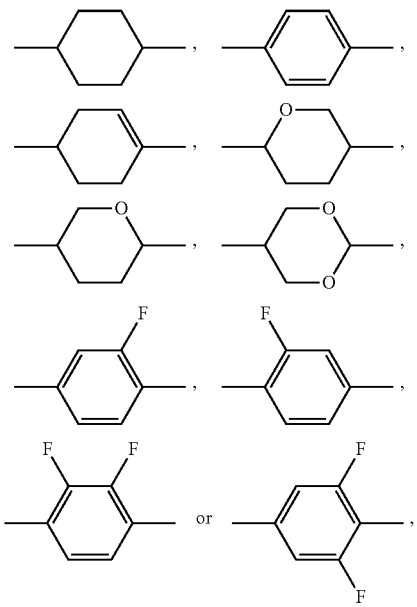

and when o=2,

is the same or different;

X$_3$ independently represents hydrogen, halogen, an alkyl having a carbon atom number of 1-10, an alkoxy having a carbon atom number of 1-10, an alkenyl having a carbon atom number of 2-10, an alkenyloxy having a carbon atom number of 2-10, a halogenated alkyl having a carbon atom number of 1-5, a halogenated alkoxy having a carbon atom number of 1-5, a halogenated alkenyl having a carbon atom number of 2-5 or a halogenated alkenyloxy having a carbon atom number of 2-5;

G independently represents the following group (I), group (II) or group (III):

(I). selected from at least one of an alkyl having a carbon atom number of 1-7, an alkoxy having a carbon atom number of 1-7, an alkenyl having a carbon atom number of 2-7 and an alkenyloxy having a carbon atom number of 2-7;

(II). groups obtained by replacing at least one hydrogen in said groups a with fluorine;

(III). selected from at least one of cyclopentyl, cyclobutyl and cyclopropyl;

L$_{31}$ and L$_{32}$ both independently represent —H or —F;

Z$_3$ independently represents —CF$_2$O—, —CH$_2$—, —CH$_2$—CH$_2$—, —CH$_2$CF$_2$—, —COO—, trans-CH=CH—, trans-CF=CF—, —CH$_2$O— or a single bond;

o is 1 or 2;

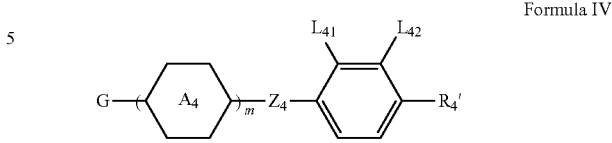

in said formula IV, R$_4$' independently represents a linear alkyl having a carbon atom number of 1-7 or an alkoxy having a carbon atom number of 1-7;

L$_{41}$ and L$_{42}$ both independently represent —H or —F;

the definition of G is the same as that of G in said formula III;

Z$_4$ independently represents a single bond, —CH$_2$CH$_2$—, —COO— or —CH$_2$O—;

m is 1 or 2; and

represents

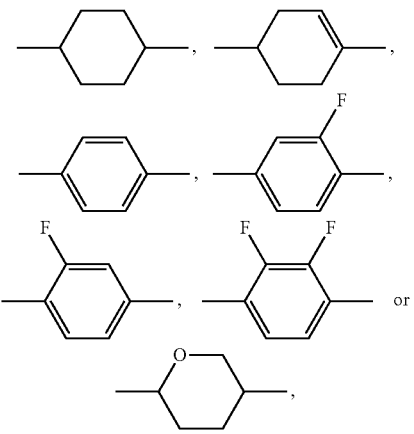

and when m=2,

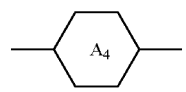

is the same or different.

5. The liquid crystal composition according to claim 4, wherein said compound as represented by formula III is selected from at least one of the compounds as represented by formulae III-1 to III-46:

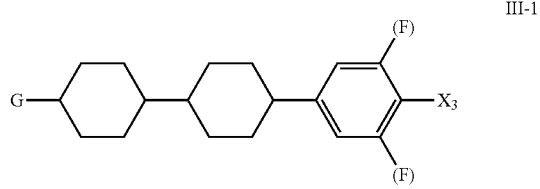

III-1

III-2
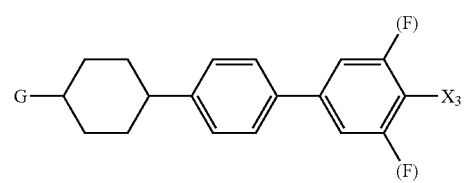
III-3
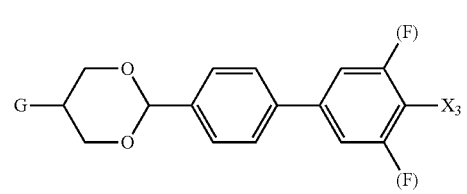
III-4
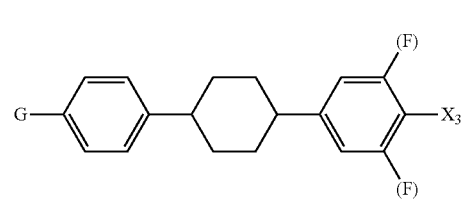
III-5
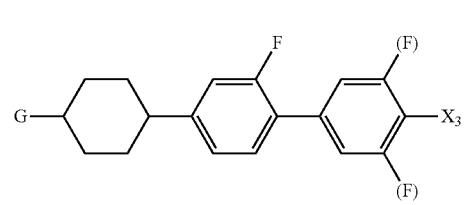
III-6
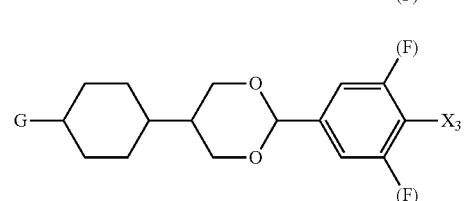
III-7
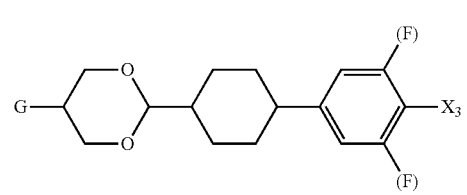
III-8
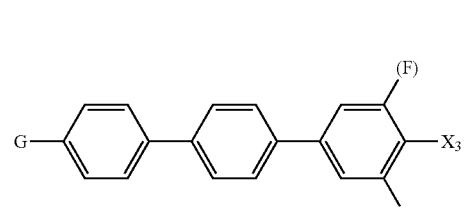
III-9
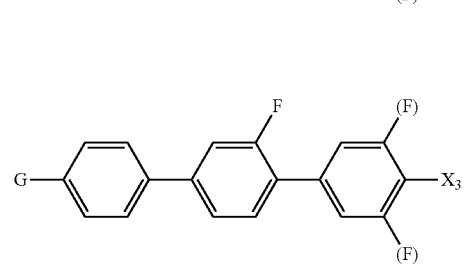
III-10
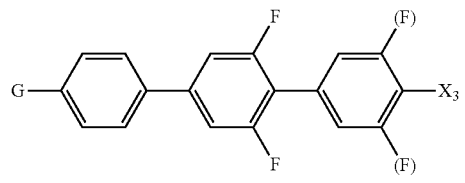
III-11
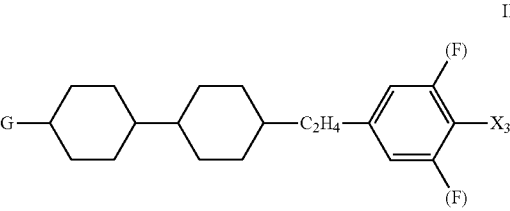
III-12
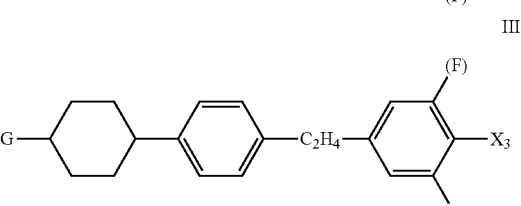
III-13
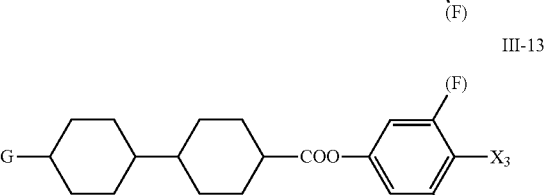
III-14
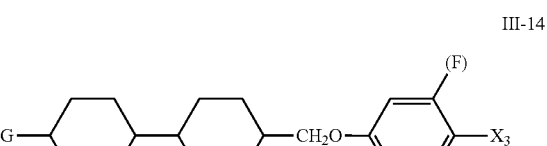
III-15
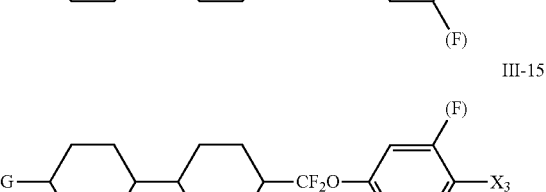
III-16
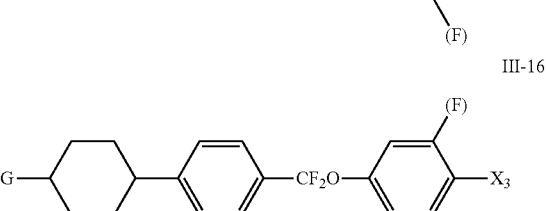
III-17
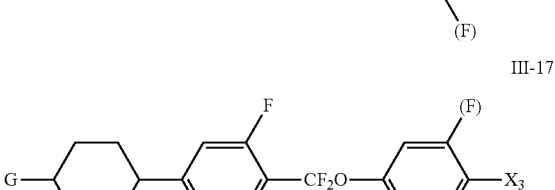

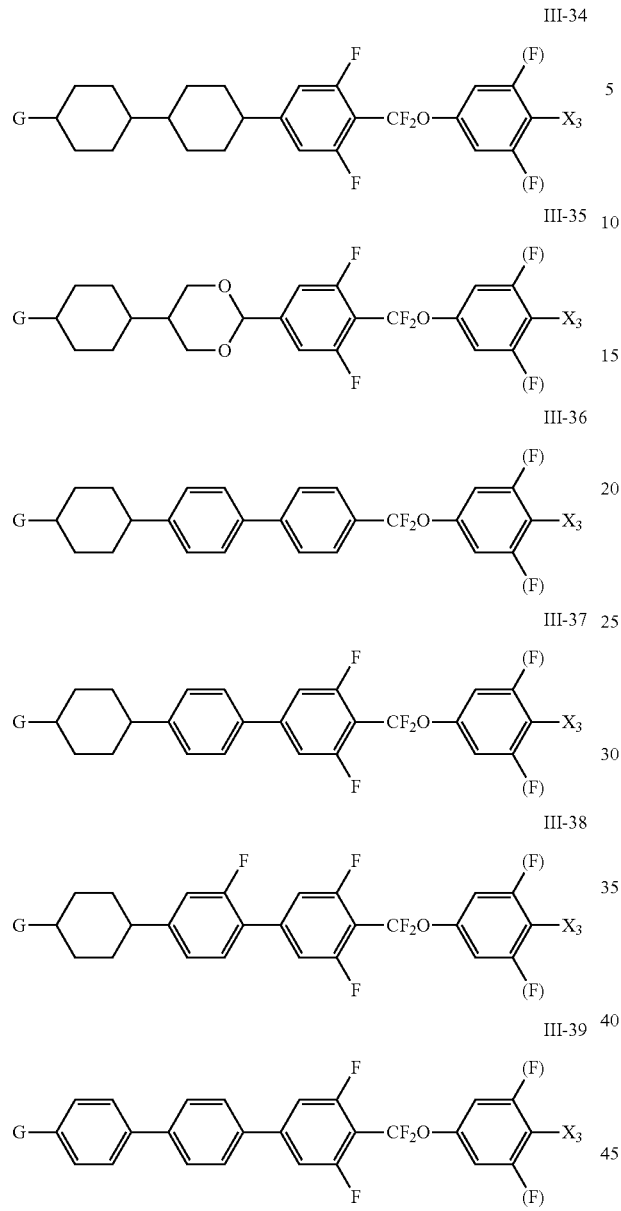
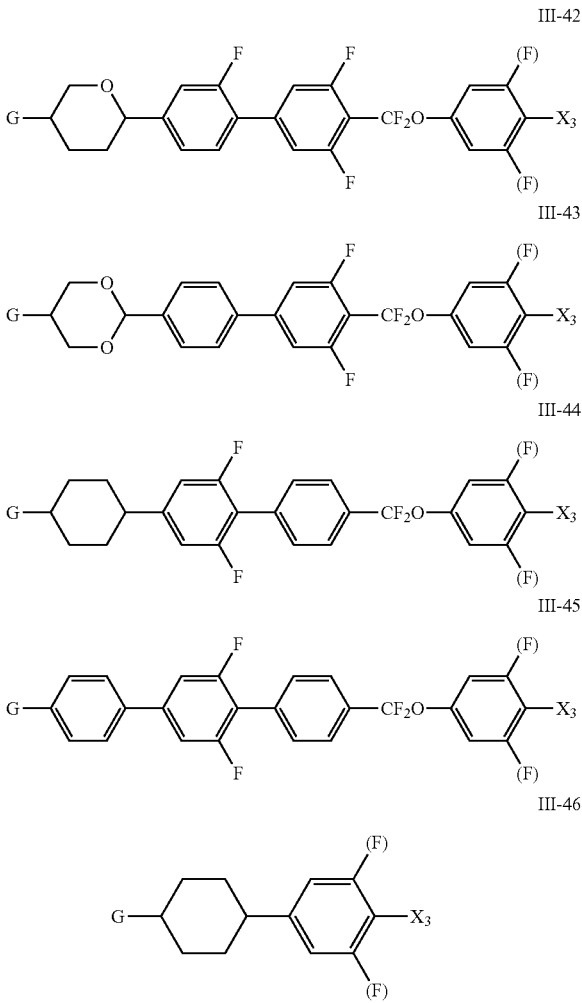
in said formulae III-1 to III-46, all of the definitions of $X_3$, G and (F) are the same as the definitions in said formula III of claim 4; and
said compound as represented by formula IV is selected from at least one of the compounds as represented by formulae IV-1 to IV-12:
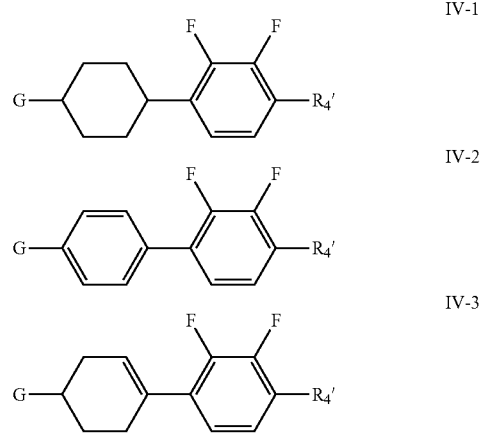

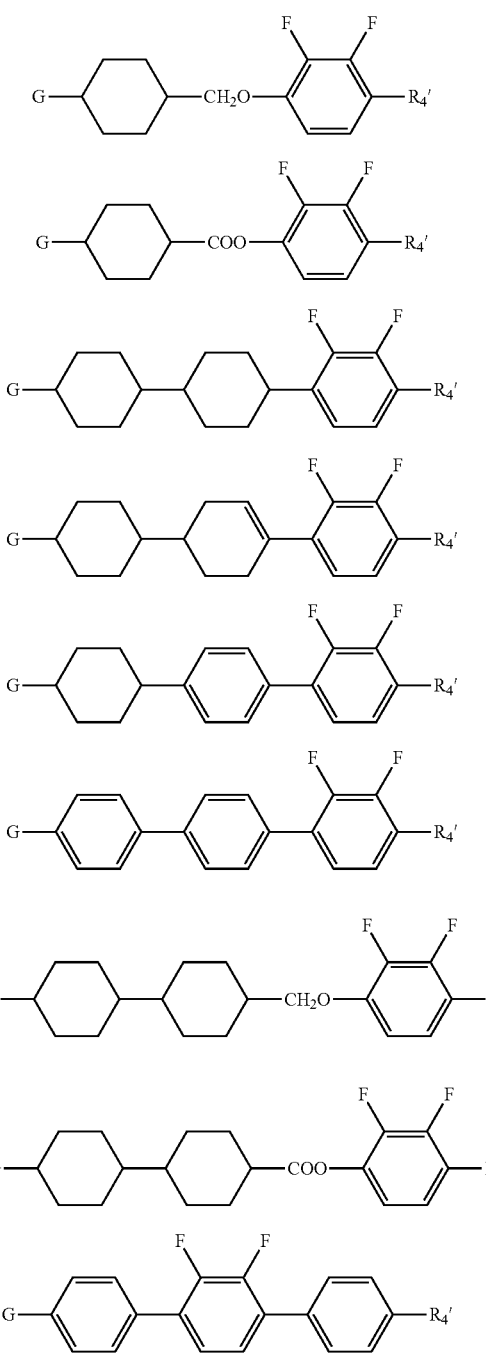

in said formulae IV-1 to IV-12, the definitions of G and R$_4$'
are both the same as the definitions in said formula IV
in claim 4.

6. The liquid crystal composition according to claim 5,
wherein said component (1) is 1-50 parts, preferably 1-40
parts, in parts by mass;
  said component (2) is 10-70 parts, preferably 15-60 parts,
    in parts by mass;
  said component (3) is 0.1-70 parts, preferably 0.2-65
    parts, in parts by mass; and
  said component (4) is 30-75 parts, preferably 35-70 parts,
    in parts by mass.

7. The liquid crystal composition according to claim 6,
wherein said liquid crystal composition further comprises a
component (5);
  said component (5) is selected from at least one of the
    compounds as represented by formula V;

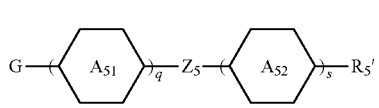

in said formula V, the definition of G is the same as that
  of the G in said formula III in claim 4;

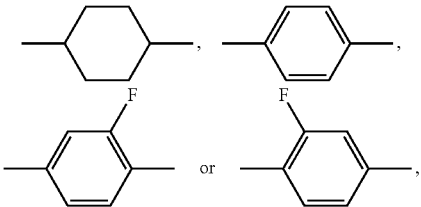

each independently represent

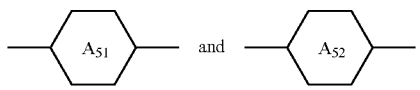

and when q or s equals to 2,

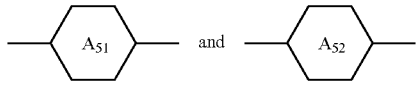

are the same or different;
  q and s independently represent 1 or 2, and when q and s
    are same, q and s represent 2, and when q and s are
    different, if q represents 1 then s represents 2, if q
    represents 2 then s represents 1;
  R$_5$' independently represents a linear alkyl having a
    carbon atom number of 1-7 or an alkoxy having a
    carbon atom number of 1-7; and
  Z$_5$ independently represents —CH$_2$—CH$_2$—, —COO—,
    trans-CH=CH—, —CH$_2$O— or a single bond.

8. The liquid crystal composition according to claim 7,
wherein said component (1) is 1-50 parts, preferably 1-40
parts, in part by mass;
  said component (2) is 10-70 parts, preferably 15-60 parts,
    in parts by mass;
  said component (3) is 0.1-70 parts, preferably 0.2-65
    parts, in parts by mass;
  said component (4) is 30-75 parts, preferably 35-70 parts,
    in parts by mass;
  said component (5) is 1-30 parts, preferably 1-25 parts, in
    parts by mass; and
  said liquid crystal composition is particularly any one of
    the following liquid crystal compositions a, b, e, g, i, k
    and m:
  said liquid crystal composition a comprises or consists of
    the following various components in parts by mass:

| | |
|---|---|
| 5BBB(2F,4F) | 5-10 |
| 3CB(3F)BC3 | 3-8 |
| 3CCV1 | 5-10 |
| 3CCV | 50-55 |
| 3BB(3F)B(3F,5F)QB(3F,4F,5F) | 5-10 |
| 4BB(3F)B(3F,5F)QB(3F,4F,5F) | 5-10 |
| 3BB(3F)B(3F,5F)2V | 10-15 |
| 5BB(3F)B(3F,5F)QB(3F,4F,5F); | 5-10 | said liquid crystal composition a particularly comprises or consists of the following various components in parts by mass:

| | |
|---|---|
| 5BBB(2F,4F) | 8 |
| 3CB(3F)BC3 | 5 |
| 3CCV1 | 6 |
| 3CCV | 51 |
| 3BB(3F)B(3F,5F)QB(3F,4F,5F) | 6 |
| 4BB(3F)B(3F,5F)QB(3F,4F,5F) | 6 |
| 3BB(3F)B(3F,5F)2V | 12 |
| 5BB(3F)B(3F,5F)QB(3F,4F,5F); | 6 | said liquid crystal composition b comprises or consists of the following various components in parts by mass:

| | |
|---|---|
| 5BBB(2F,4F) | 3-8 |
| 3CCV | 15-20 |
| VCCB1 | 5-10 |
| 1BCC2V | 5-10 |
| 3CCB(3F,4F,5F) | 10-15 |
| 5CCB(3F,4F,5F) | 10 |
| 3CBB(3F,4F,5F) | 3-8 |
| 3CCBB(3F,4F,5F) | 3-8 |
| 2CCBB(3F,4F,5F) | 3-8 |
| 3CCB(3F)B(3F,4F,5F) | 3-8 |
| H(5)BB(3F,5F)QB(3F,4F,5F); | 28-22 | said liquid crystal composition b particularly comprises or consists of the following various components in parts by mass:

| | |
|---|---|
| 5BBB(2F,4F) | 5 |
| 3CCV | 18 |
| VCCB1 | 8 |
| 1BCC2V | 7 |
| 3CCB(3F,4F,5F) | 12 |
| 5CCB(3F,4F,5F) | 10 |
| 3CBB(3F,4F,5F) | 5 |
| 3CCBB(3F,4F,5F) | 5 |
| 2CCBB(3F,4F,5F) | 5 |
| 3CCB(3F)B(3F,4F,5F) | 5 |
| H(5)BB(3F,5F)QB(3F,4F,5F); | 20 | said liquid crystal composition e comprises or consists of the following various components in parts by mass:

| | |
|---|---|
| 3BBB(2F,4F) | 5-10 |
| 5BBB(2F,4F) | 5-10 |
| 3OBBB(2F,4F) | 1-5 |
| 1OBBB(2F,4F) | 1-5 |
| 3CCV | 40 |
| 3CCV1 | 5-10 |
| 1BBEV1 | 1-5 |
| H(5)BBB(3F)B(3F,4F,5F) | 1-5 |
| 3CCB(3F)B(3F,4F,5F) | 5-10 |
| H(5)BB(3F,5F)QB(3F,4F,5F) | 10-15 |
| H(5)BB(3F) B(3F,5F)QB(3F,4F,5F) | 8-13 | said liquid crystal composition e particularly comprises or consists of the following various components in parts by mass:

| | |
|---|---|
| 3BBB(2F,4F) | 6 |
| 5BBB(2F,4F) | 6 |
| 3OBBB(2F,4F) | 4 |
| 1OBBB(2F,4F) | 4 |
| 3CCV | 40 |
| 3CCV1 | 6 |
| 1BBEV1 | 4 |
| H(5)BBB(3F)B(3F,4F,5F) | 1 |
| 3CCB(3F)B(3F,4F,5F) | 6 |
| H(5)BB(3F,5F)QB(3F,4F,5F) | 13 |
| H(5)BB(3F) B(3F,5F)QB(3F,4F,5F) | 10 | said liquid crystal composition g comprises or consists of the following various components in parts by mass:

| | |
|---|---|
| 3BBB(2F,4F) | 8-13 |
| 4BBB(2F,4F) | 8-13 |
| 5BBB(2F,4F) | 8-13 |
| 2OBBB(2F,4F) | 3-8 |
| 3CCV | 50-55 |
| 3CCV1 | 1-5 |
| 1BBEV1 | 1-5 |
| H(5)BB(3F,5F)QB(3F,4F,5F) | 1-5 |
| H(5)H[3O]BB(3F,5F)QB(3F,4F,5F) | 1-5 |
| H(5)BBB(3F)B(3F,4F,5F) | 1-5 | said liquid crystal composition g particularly comprises or consists of the following various components in parts by mass:

| | |
|---|---|
| 3BBB(2F,4F) | 10 |
| 4BBB(2F,4F) | 10 |
| 5BBB(2F,4F) | 10 |
| 2OBBB(2F,4F) | 5 |
| 3CCV | 51 |
| 3CCV1 | 3 |
| 1BBEV1 | 2 |
| H(5)BB(3F,5F)QB(3F,4F,5F) | 3 |
| H(5)H[3O]BB(3F,5F)QB(3F,4F,5F) | 3 |
| H(5)BBB(3F)B(3F,4F,5F) | 3 | said liquid crystal composition i comprises or consists of the following various components in parts by mass:

| | |
|---|---|
| 5BBB(2F,4F) | 5-10 |
| 3BBB(2F,4F) | 5-10 |
| 3CCV | 25-30 |
| 3CCV1 | 1-5 |
| 3CB(3F)BC3 | 1-5 |
| 3C1OB(2F,3F)O2 | 3-8 |
| 3CC1OB(2F,3F)O2 | 8-13 |
| 2CC1OB(2F,3F)O2 | 8-13 |
| 5CC1OB(2F,3F)O2 | 8-13 |
| H(5)C1OB(2F,3F)O2 | 10-15 |
| H(5)BBB(3F)B(3F,4F,5F) | 1-5 | said liquid crystal composition i particularly comprises or consists of the following various components in parts by mass:

| | |
|---|---|
| 5BBB(2F,4F) | 9 |
| 3BBB(2F,4F) | 8.75 |
| 3CCV | 28 |
| 3CCV1 | 4 |

-continued

| | |
|---|---|
| 3CB(3F)BC3 | 2 |
| 3C1OB(2F,3F)O2 | 5 |
| 3CC1OB(2F,3F)O2 | 10 |
| 2CC1OB(2F,3F)O2 | 10 |
| 5CC1OB(2F,3F)O2 | 10 |
| H(5)C1OB(2F,3F)O2 | 13 |
| H(5)BBB(3F)B(3F,4F,5F) | 0.25 | said liquid crystal composition k comprises or consists of the following various components in parts by mass:

| | |
|---|---|
| 5BBB(2F,4F) | 1-5 |
| 3CBB2 | 5-10 |
| 5CBB2 | 5-10 |
| 3CB(3F)BC3 | 1-5 |
| 5BB1 | 5-10 |
| 2CC3 | 18-23 |
| 4CC3 | 5-10 |
| 5CC3 | 5-10 |
| 3CC1OB(2F,3F)O2 | 10-15 |
| 2CC1OB(2F,3F)O2 | 10-15 |
| 3BB(2F,3F)O2 | 10-15 |
| 2C1OB(2F,3F)O2 | 5-10 | said liquid crystal composition k particularly comprises or consists of the following various components in parts by mass:

| | |
|---|---|
| 5BBB(2F,4F) | 2 |
| 3CBB2 | 8 |
| 5CBB2 | 8 |
| 3CB(3F)BC3 | 1 |
| 5BB1 | 6 |
| 2CC3 | 20 |
| 4CC3 | 6 |
| 5CC3 | 6 |
| 3CC1OB(2F,3F)O2 | 12 |
| 2CC1OB(2F,3F)O2 | 12 |
| 3BB(2F,3F)O2 | 13 |
| 2C1OB(2F,3F)O2 | 6 | said liquid crystal composition m comprises or consists of the following various components in parts by mass:

| | |
|---|---|
| 5BBB(2F,4F) | 8-12 |
| 3CBB2 | 3-8 |
| 3CCV | 30-35 |
| 3CC1OB(2F,3F)O2 | 10-15 |
| 2CC1OB(2F,3F)O2 | 10-15 |
| 5CC1OB(2F,3F)O2 | 3-8 |
| H(5)CBB(2F,3F)O2 | 5-10 |
| H(5)BB(2F,3F)O2 | 3-8 |
| H(5)C1OB(2F,3F)O2 | 10-15 | said liquid crystal composition m particularly comprises or consists of the following various components in parts by mass:

| | |
|---|---|
| 5BBB(2F,4F) | 10 |
| 3CBB2 | 5 |
| 3CCV | 32 |
| 3CC1OB(2F,3F)O2 | 12 |
| 2CC1OB(2F,3F)O2 | 12 |
| 5CC1OB(2F,3F)O2 | 5 |
| H(5)CBB(2F,3F)O2 | 7 |
| H(5)BB(2F,3F)O2 | 5 |
| H(5)C1OB(2F,3F)O2 | 12. |

9. The liquid crystal composition according to claim 8, wherein said liquid crystal composition further comprises an additive;

said additive is selected from at least one of a UV stabilizer, an antioxidant, a chiral dopant and a polymerization initiator; and said additive is used in an amount of 0.01%-0.5% of the mass of the liquid crystal composition consisting of components (1) to (5).

10. An active matrix display element comprising the liquid crystal composition of claim 1.

\* \* \* \* \*